US012091139B2

(12) United States Patent
Miller

(10) Patent No.: US 12,091,139 B2
(45) Date of Patent: Sep. 17, 2024

(54) ROPE MANAGEMENT SYSTEM

(71) Applicant: Rope Buddy, LLC., Lehi, UT (US)

(72) Inventor: Michael Miller, Lehi, UT (US)

(73) Assignee: ROPE BUDDY, LLC., Lehi, UT (US)

( * ) Notice: Subject to any disclaimer, the term of this patent is extended or adjusted under 35 U.S.C. 154(b) by 0 days.

(21) Appl. No.: 18/448,531

(22) Filed: Aug. 11, 2023

(65) Prior Publication Data

US 2024/0051644 A1 Feb. 15, 2024

Related U.S. Application Data

(60) Provisional application No. 63/397,126, filed on Aug. 11, 2022.

(51) Int. Cl.
*B63B 34/67* (2020.01)
*B66D 1/48* (2006.01)

(52) U.S. Cl.
CPC ................ *B63B 34/67* (2020.02); *B66D 1/48* (2013.01); *B66D 2700/0116* (2013.01)

(58) Field of Classification Search
CPC ......... B63B 34/60; B63B 34/63; B63B 34/67; B65H 75/425; B65H 75/4463; B65H 75/48; B65H 75/486
See application file for complete search history.

(56) References Cited

U.S. PATENT DOCUMENTS

| | | | | |
|---|---|---|---|---|
| 2,816,310 A * | 12/1957 | Nale | B63B 34/67 | 242/380 |
| 3,178,127 A * | 4/1965 | Andersen | B63B 34/67 | 114/247 |
| 3,536,298 A * | 10/1970 | Deslierres | F16D 63/002 | 114/244 |
| 4,133,496 A * | 1/1979 | Zetah | B65H 75/425 | 242/390.8 |
| 7,234,408 B1 * | 6/2007 | Clemmons | B63B 34/67 | 114/364 |
| 7,334,808 B2 * | 2/2008 | Fatzinger | B63B 34/67 | 114/253 |
| 10,246,168 B1 * | 4/2019 | Stohler | B63B 34/60 | |
| 10,640,181 B1 * | 5/2020 | Decker | B63B 21/56 | |
| 11,541,972 B2 | 1/2023 | Swiatek | | |
| 2020/0216147 A1 * | 7/2020 | Herrick | B63B 21/56 | |

* cited by examiner

*Primary Examiner* — Ajay Vasudeva
(74) *Attorney, Agent, or Firm* — KILPATRICK TOWNSEND & STOCKTON LLP

(57) ABSTRACT

An apparatus for automated rope management on a vessel is described. The apparatus may include a first retraction unit configured to provide rotation about a first rotational axis, a second retraction unit connected to the first retraction unit and configured to provide rotation about a second rotational axis, and a mounting bracket coupled to the first retraction unit and configured for mounting the apparatus to the vessel.

17 Claims, 22 Drawing Sheets

TOP SIDE VIEW

BOTTOM SIDE VIEW

SECTION A-A

ROPE MANAGEMENT SYSTEM

CROSS-REFERENCES TO RELATED APPLICATIONS

This claims the benefit of priority of U.S. Provisional Patent Application No. 63/397,126, titled "ROPE MANAGEMENT SYSTEM" and filed Aug. 11, 2022, the entirety of which is incorporated herein by reference.

BACKGROUND

Wake surfing has become a popular recreational activity. A surfer riding a board is pulled behind a boat using a rope. The surfer may position the board in a wake of the boat such that the wake carries the board and the surfer. When this occurs, the rope is no longer needed, and the surfer can let go.

BRIEF DESCRIPTION OF THE DRAWINGS

Various embodiments in accordance with the present disclosure will be described with reference to the drawings, in which.

DETAILED DESCRIPTION

Figure 1:
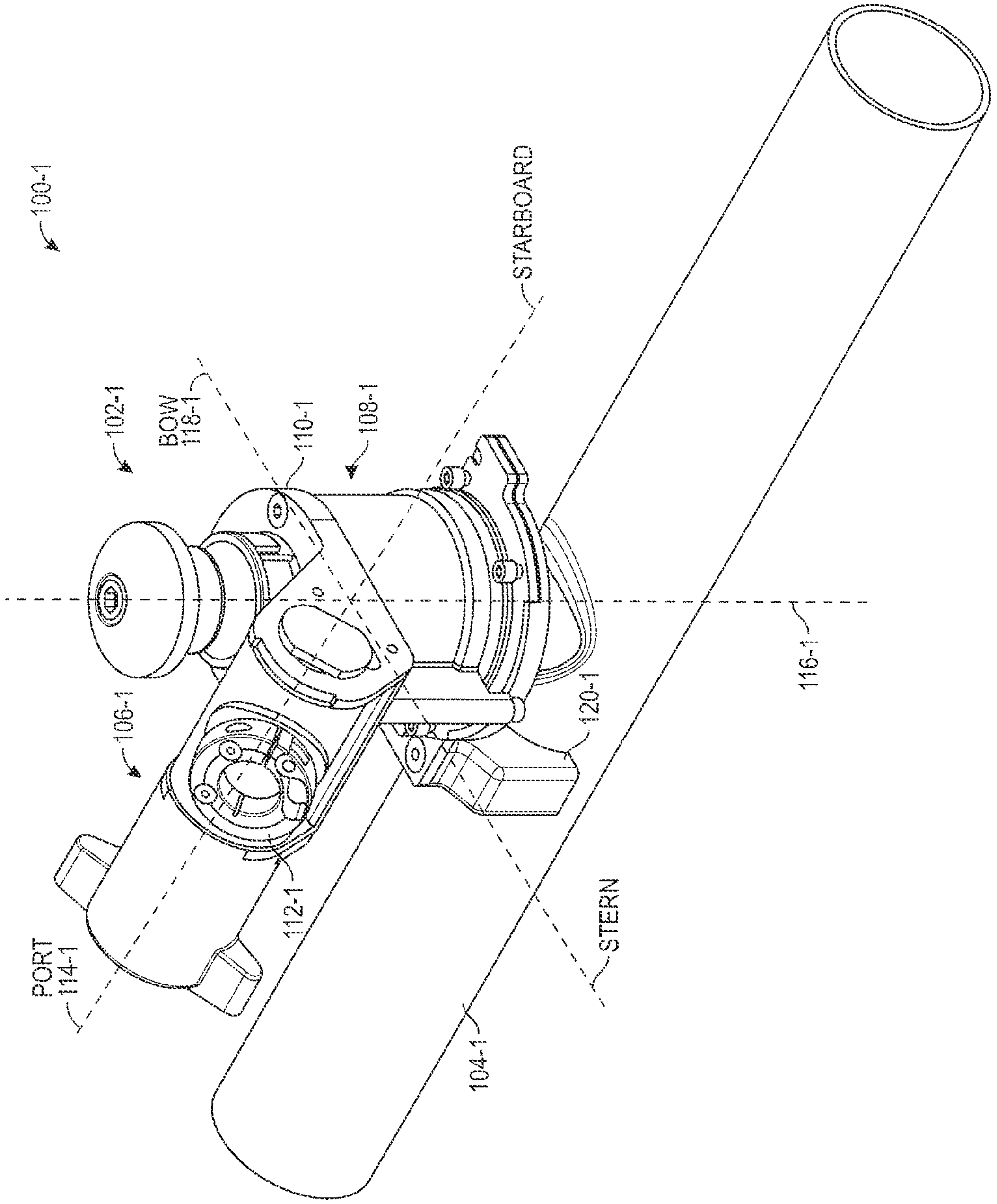
FIG. 1 illustrates an example rope management system, in accordance with various embodiments.

Examples are described herein in the context of rope management systems for managing a rope used for wake surfing behind a boat. Those of ordinary skill in the art will realize that the following description is illustrative only and is not intended to be in any way limiting. For example, the features described with respect to a rope management apparatus are applicable to the field in which an object could be automatically moved from a first position to a second position in two dimensions of rotation. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Conventionally, a tow rope may be used to tow a surfer on a surfboard or other recreational equipment (e.g., wakeboard, water skis, kneeboard, air foil, etc.). A first end of the tow rope may be connected to a tow point within the boat (e.g., a tower, a pole, or a hook), and a second end that includes a handle is let out to the surfer in the water. As tension is put on the rope by the boat (e.g., as the boat begins to increase its speed), the surfer holds the handle and the boat pulls the surfer out of the water. Once a wake has been formed behind the boat, the surfer may use the force of the wake to propel themselves along behind the boat (i.e., to "surf" the wake behind the boat). When the surfer is moving like this, the tension on the rope is significantly reduced, even to the point that the rope may no longer be needed. Thus, surfers may coil the rope up and hold the rope at their hip, let the rope drag, or throw the rope back into the boat. Each of these actions may lead to undesirable outcomes. For example, if the surfer falls with the rope held in a coil, there is a chance that the rope could get wrapped around the surfer leading to injury. If the surfer leaves the rope in the water, the same problem could occur and/or the rope could be inadvertently caught on the boat. If the surfer throws the rope into the boat, there is a chance the surfer may lose their balance while doing so and an even higher chance that the handle hits a passenger in the boat potentially causing injuries.

After the surfer has fallen or has lost momentum after letting go of the rope, the boat driver needs to turn the boat around and return the rope (and handle) to the surfer who is now floating in the water. Ropes for wake surfing are quite short (e.g., less than 30 feet), meaning it can be difficult (e.g., as compared to towing users doing other activities that use longer ropes) for the driver to maneuver the boat close enough to the surfer so that the surfer can get the rope, but not so close that the boat collides with the surfer. In some cases, the driver may miss the surfer altogether requiring additional time to circle the boat back to try again. In other cases, passengers on the boat may be able to help get the rope to the surfer, but such help may only provide incremental benefits as these passengers may be distracted or may otherwise get entangled with the rope.

The systems, devices, apparatuses, and approaches for rope management described herein address these and other problems with conventional tow points. In particular, the rope management system described herein includes a rope management apparatus that automatically moves the rope from a stowed position along a side of the boat (e.g., depending on whether the surfer is regular stance or goofy stance) to a deployed position behind the boat. In the stowed position, the surfer can easily grab the rope as the boat passes. This can be done without any help from other passengers. As the boat continues away from the surfer and tension is put on the rope, the rope management apparatus adjusts from the stowed position to the deployed position responsive to the tension (e.g., an exerted force). The adjustment includes a compound rotation (e.g., rotation about a vertical axis such as from the starboard side to the stern and rotation about a lateral axis such as from an upward orientation to a downward orientation) from the stowed position to the deployed position. In some examples, the rotation may only be with respect to a single axis. In any event, in the deployed position, the rope is aligned for pulling the surfer up, and the experience for the surfer is identical to being pulled using a conventional tow point on a tower unit of a vessel. Once the surfer is up and riding the wave, to get rid of the rope the surfer simply lets go of the handle and the rope management system can automatically lift the handle up in the air and return it to the side of the boat where it can freely and safely rest while the surfer rides the wave.

This illustrative example is given to introduce the reader to the general subject matter discussed herein and the disclosure is not limited to this example. The following sections describe various additional non-limiting examples of rope management systems.

Figure 2:
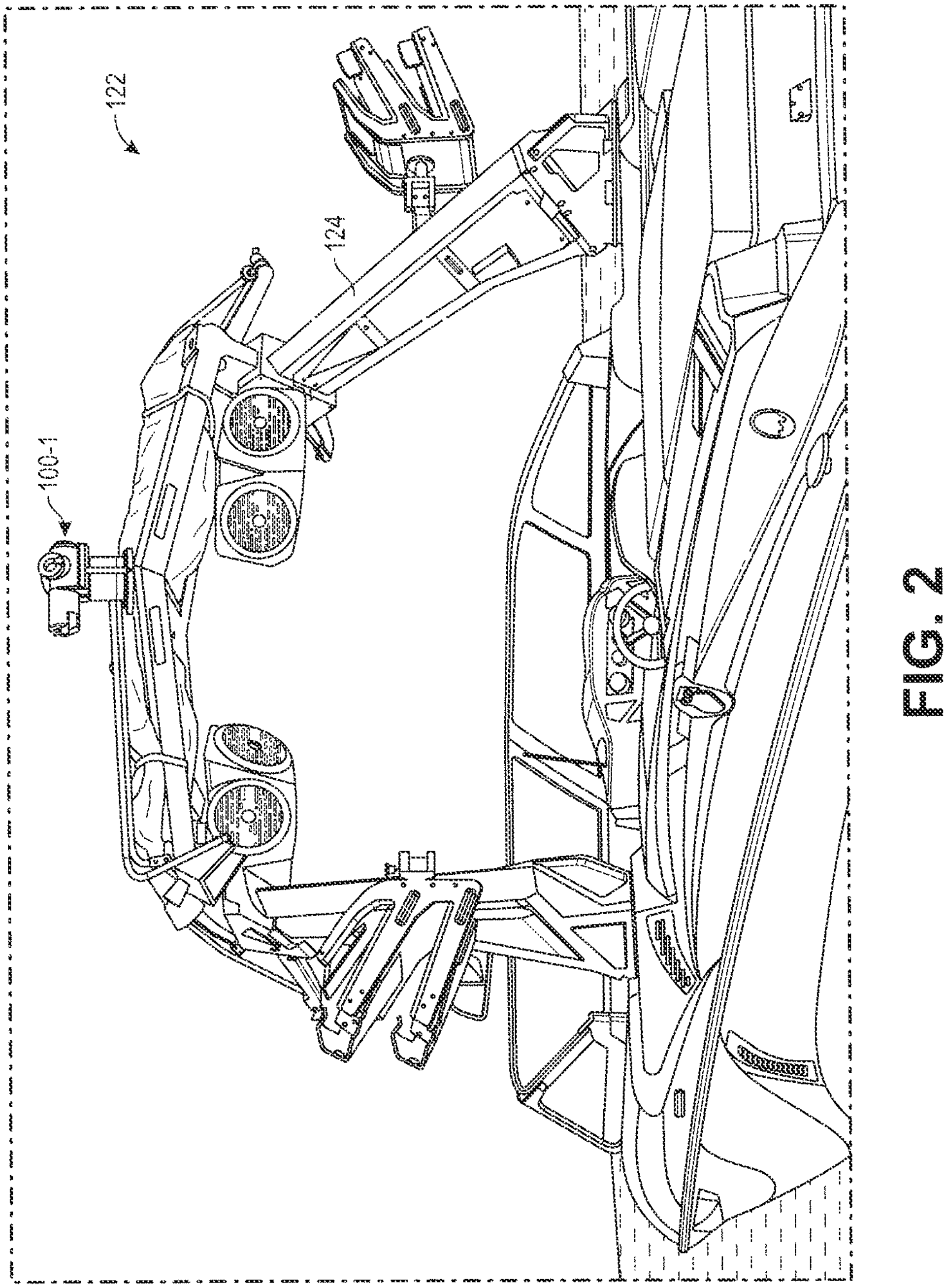
FIG. 2 illustrates a tow vessel including the rope management system connected to a tower, in accordance with various embodiments.

Referring now to the figures, FIG. 1. illustrates an example rope management system 100-1, according to at least one example. The rope management system 100-1 includes a rope management apparatus 102-1 that may be connected to a location within a tow vessel 122-1 (e.g., a boat, a recreational vehicle, a motorized vehicle, and the like) such as to a tower 104-1. In FIG. 1 and similar figures, only a portion of the tower 104-1 is depicted for ease of viewing. FIG. 2 illustrates a tow vessel 122-1 including the rope management system 100-1 connected to a tower 124, which is an example of the tower 104-1. The rope management system 100-1 may also be connected at other locations on the tower 124-1 (e.g., at a top corner, on an underside, along a vertical surface of one side, and the like) or at a different location on the vessel 122-1 (e.g., along a side, at a rear corner, on a pole mounted to the vessel 122-1, and the like). In some examples, more than one rope management system 100-1 may be deployed on the vessel 122-1. For example, a first rope management system 100-1 may be connected at a first location on the tower 124-1 (e.g., a starboard side) and a second rope management system 100-1 may be connected at a different location on the tower 124-1 (e.g., a port side). In some examples, structural parts of the rope management system 100-1 may be divided and connected at different locations on the vessel 122-1 and/or the tower 124-1. For example, a first structure that enables a first rotating function (e.g., one of the retraction units 106-1 or 108-1 to enable a side to side rotation or movement) may be mounted at a first location (e.g., on a side surface of the tower 124-1) and a second structure that enables a second rotating function (e.g., one of the retraction units 106-1 or 108-1 to enable an up and down rotation or movement) may be mounted at a second location (e.g., at a back corner of the vessel 122-1). The rope management apparatus 102-1 can also be integrally formed (e.g., welded, bonded, cast, or otherwise integrated) into the tower 124-1 or other suitable location on the vessel 122-1. For example, the rope management apparatus 102-1 can be joined to the tower 124-1 such that the apparatus 102-1 and the tower 124-1 are presented as a single unit on the vessel 122-1. In a particular example, some or all of the components of the rope management apparatus 102-1 can be welded or bonded to locations on the exterior and/or interior of the tower 124-1.

In some examples, a single retraction unit 106-1 or 108-1 may be configured to provide rotational movement about an axis. Such rotational movement may enable the retraction unit 106-1, 108-1 to function as a reel to "wind up" a rope 128-1 and unwind responsive to an exerted force. For example, a first end of a boom pole 126-1 may be mounted at a rear corner of vessel 122-1 and a retraction unit 106-1, 108-1, as described to function as a reel, may be mounted at a second end of the boom pole 126-1. A pull rope may be attached to a tow point on a tower 124-1. The retraction unit 106-1, 108-1 may have a cable extending between the retraction unit 106-1, 108-1 and the pull rope. In this example, the function of the retraction unit 106-1, 108-1 may operate to wind up the cable and pull the handle 130-1 out of the water, when no force is exerted on the handle 130-1. However, when a force is exerted on the handle 130-1 (e.g., a surfer grabs the handle 130-1), the retraction unit 106-1, 108-1 may unwind and permit the handle 130-1 to extend until the rope 128-1 tightens at the tow point on the tower 124-1. When the force is eliminated (e.g., the surfer releases the handle 130-1), the retraction unit 106-1, 108-1 will wind up the cable and return the handle 130-1 to a location that is out of the water.

Figure 3:
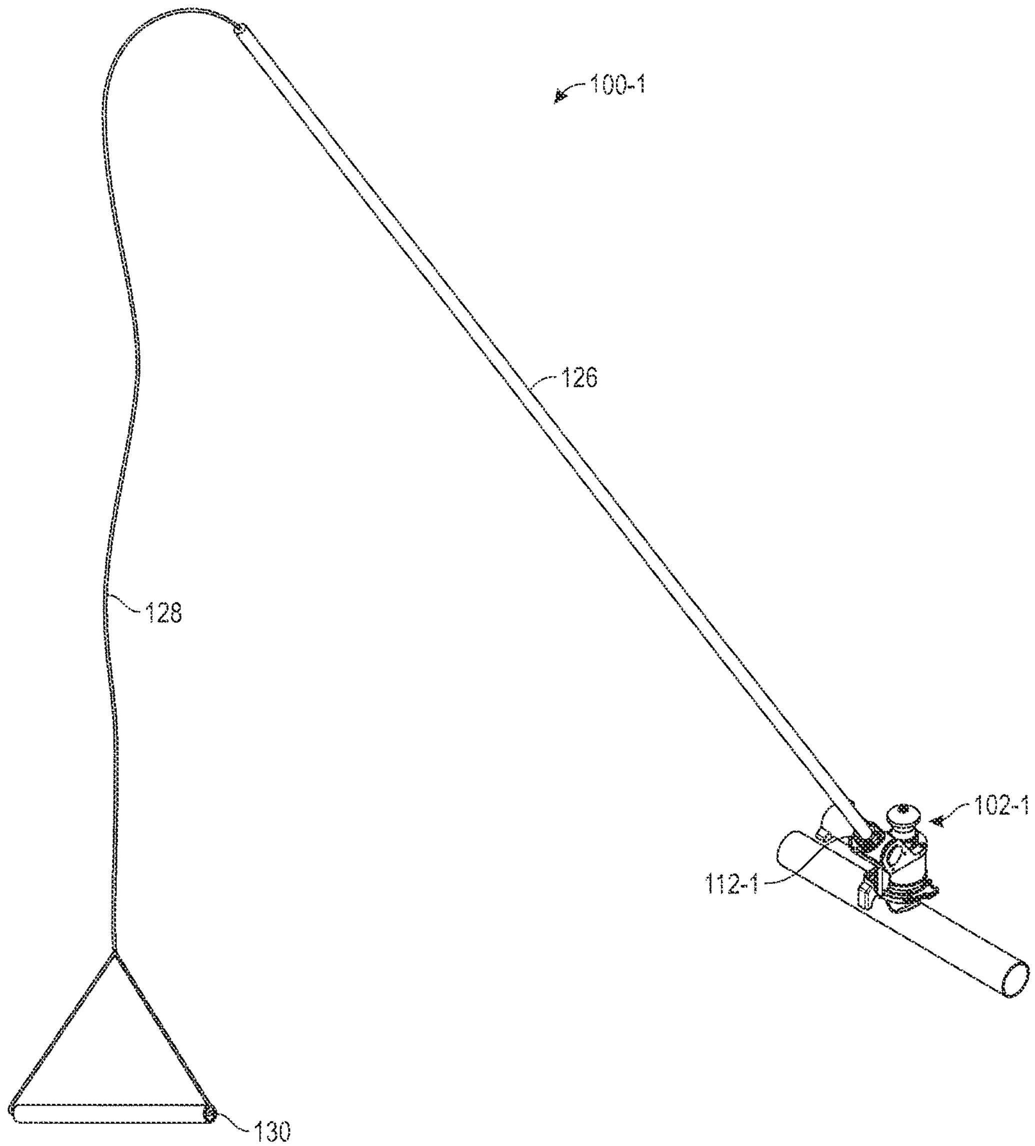
FIG. 3 illustrates a boom pole attached to the rope management system, in accordance with various embodiments.

The rope management apparatus 102-1 includes a lateral retraction unit 106-1, a vertical retraction unit 108-1, and a mounting bracket 120-1. Generally, components of the lateral retraction unit 106-1, the vertical retraction unit 108-1, and the mounting bracket 120-1 may be formed from rigid materials such as steel, stainless steel, aluminum, and any other suitable materials. The lateral retraction unit 106-1 may be connected to the vertical retraction unit 108-1 via a fixed carrier 110-1. The lateral retraction unit 106-1 may include an attachment point 112-1 configured to receive a boom pole 126-1, rope 128-1, other compliant member to which a rope 126-1 may be connected, and/or any other suitable object used for towing users. For example, as shown in FIG. 3, the rope management system 100-1 may include the boom pole 126-1, a rope 128-1, and a handle 130-1. As can be seen, the boom pole 126-1 may extend away from the attachment point 112-1 and increase the height of the connection between the rope 128-1 and the boom pole 126-1. The boom pole 126-1 may be a separate element from the rope 128-1. For example, the boom pole 126-1 may releasably (or fixedly) couple with the attachment point 112-1 at one end and releasably (or fixedly) couple with the rope 128-1 at the other end. For example, the rope 128-1 may be connected to the boom pole 126-1 via a knot, loops, a releasable connector such as a D-ring, or other similar connecting part. In some examples, the rope 128-1 may be connected to the boom pole 126-1 at a location within the boom pole 126-1, which may make for an integrally formed boom pole 126-1 and rope 128-1 system. In some examples, the rope 128-1 may extend to and connect at the attachment point 112-1 (or other location on the rope management apparatus 102-1). In this example, the rope 128-1 may be threaded through one or more eyelets of the boom pole 126-1 to suspend the rope 128-1 (and handle 130-1) in the air, but the main force on the rope 128-1 may be directed at the attachment point 112-1. In some examples, the length of the boom pole 126-1 may be adjusted based on the length of the rope 128-1, the height of the mounting point above the water, and/or other factors (e.g., width of the boat, etc.). In particular examples, the length of the boom pole 126-1 may be approximately 10 ft. In some examples, the boom pole 126-1 may be adjustable to lengths between 8 ft and 12 ft. In particular examples, the length of the rope 128-1 may vary based on the various factors, such as the length of the vessel 122-1. In some examples, the length of the rope 128-1 may be approximately 25 ft. In particular examples, the length of the rope 128-1 may range between 23 ft and 25 ft.

Generally, the lateral retraction unit 106-1 may be configured to enable rotation of a portion of the lateral retraction unit 106-1 via a lateral axis 114-1 of the rope management apparatus 102-1 that extends across the vessel 122-1 from a right or starboard side to a left or port side. Likewise, the vertical retraction unit 108-1 may be configured to enable rotation of a portion of the vertical retraction unit 108-1 via a vertical axis 116-1 of the rope management apparatus 102-1. The rope management system 100-1 may also be defined with respect to a longitudinal axis 118-1 that extends from the bow or front of the vessel 122-1 to the stern or back of the vessel 122-1. For example, the rope management apparatus 102-1 may be adjusted such that the boom pole 126-1 is directed generally toward the stern of the vessel 122-1 when deployed.

In some examples, the compliance of the lateral retraction unit 106-1 may be excluded from the rope management apparatus 102-1. For example, the lateral retraction unit 106-1 may be fixedly mounted to the vertical retraction unit 108-1 (e.g., via the fixed carrier 110-1 or otherwise). Rather than having the lateral retraction unit 106-1, the compliance in the boom pole 126-1 may be used to move the handle 130-1 out of the water when not under tension. In some examples, the boom pole 126-1 may have characteristics comparable to a large fishing rod, boom antenna, or the like. In some examples, rather than the using the rope 128-1, a longer boom pole 126-1 may be used, which includes a handle 130-1 at one end and is attached to the attachment point 112-1 at the other end. In some examples, the boom pole 126-1 is not included in the system 100-1. For example, the rope 128-1 may be connected directly to the rope management apparatus 102-1 (e.g., at the attachment point 112-1). In some examples, an extension arm may be used, either rigid or formed from a compliant material, which extends away from the attachment point 112-1 and retains the rope 128-1 partway between the attachment point 112-1 and the handle 130-1 (e.g., when the boom pole 126-1 is not used). For example, the extension arm may have an elongated profile and include an eyelet or hook at a distal end and be connected to the rope management apparatus 102-1 at a proximal end. The rope 128-1 may be threaded through the eyelet or hook and retain the rope 128-1 at an elevation above the vessel 122-1. In some examples, the extension arm may have similar characteristics of the boom pole 126-1, but because the rope 128-1 is connected directly to the rope management apparatus 102-1, the boom pole 126-1 may not need to be as strong as in the other examples. This is because the only load put on the boom pole 126-1 in this example is from the weight of the rope 128-1 and handle 130-1.

Figure 4:
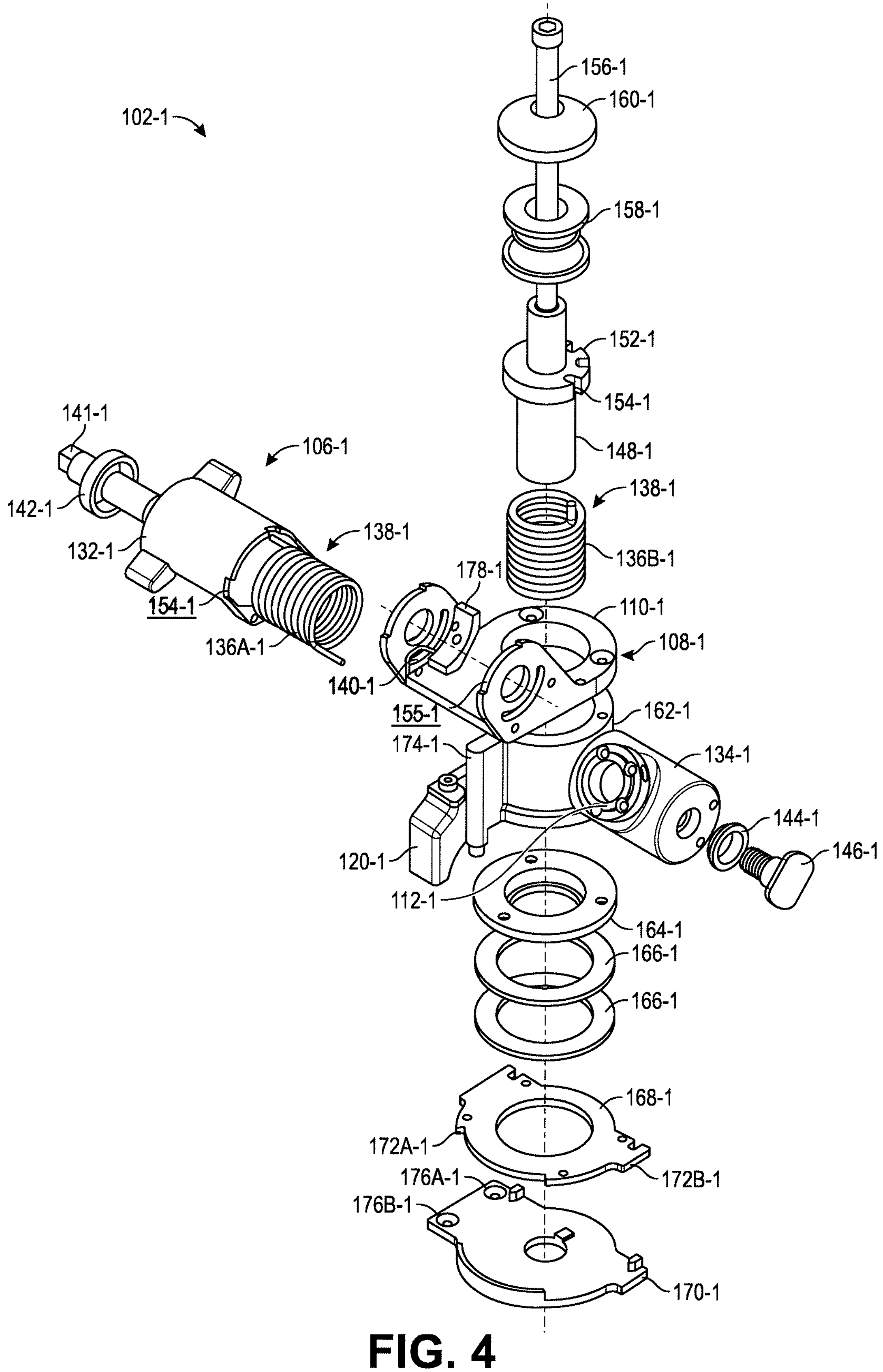
FIG. 4 illustrates an exploded view of the rope management apparatus, in accordance with various embodiments.
Figure 5:
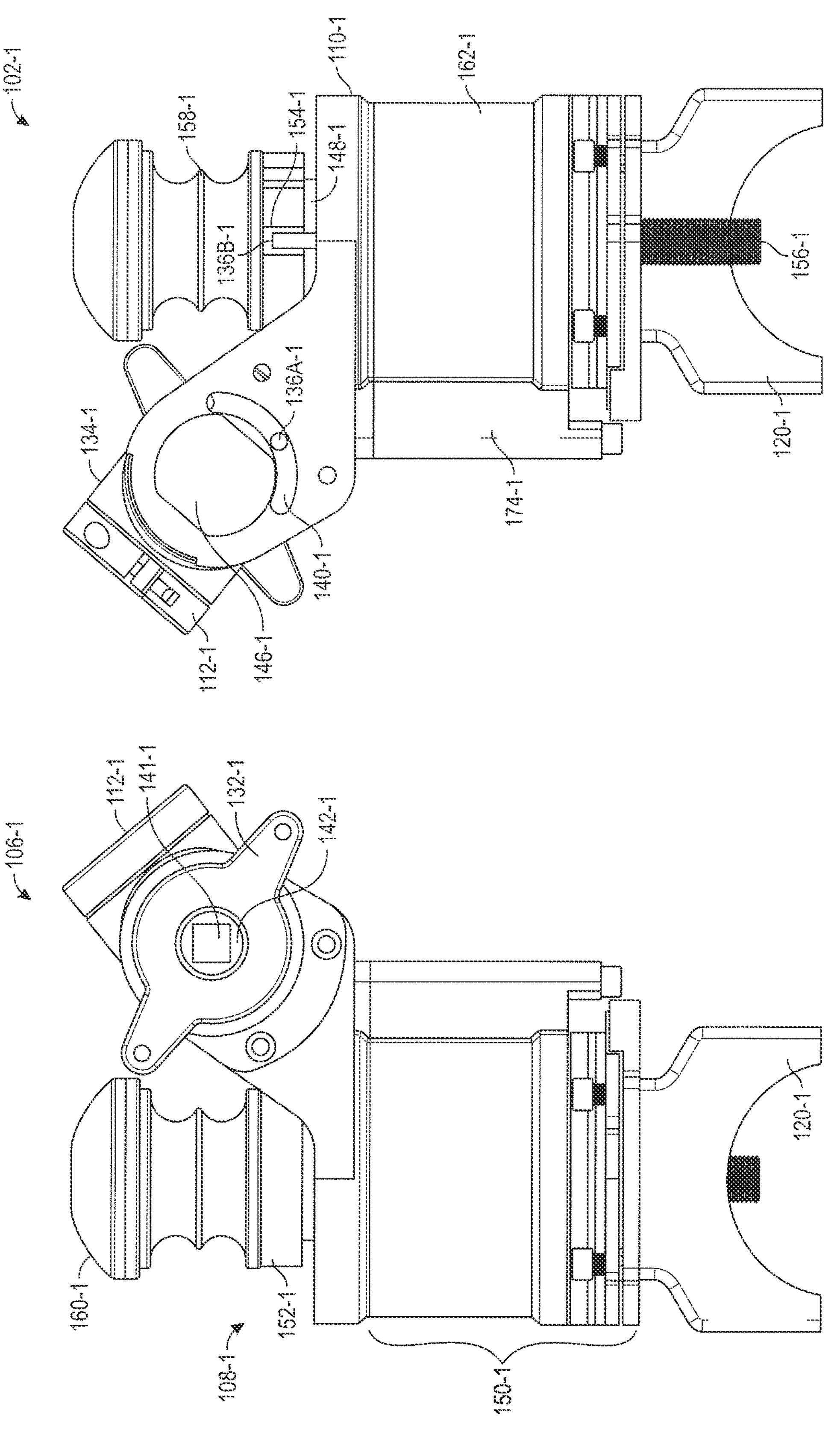
FIG. 5 illustrates left and right side views of the rope management apparatus, in accordance with various embodiments.
Figure 6:
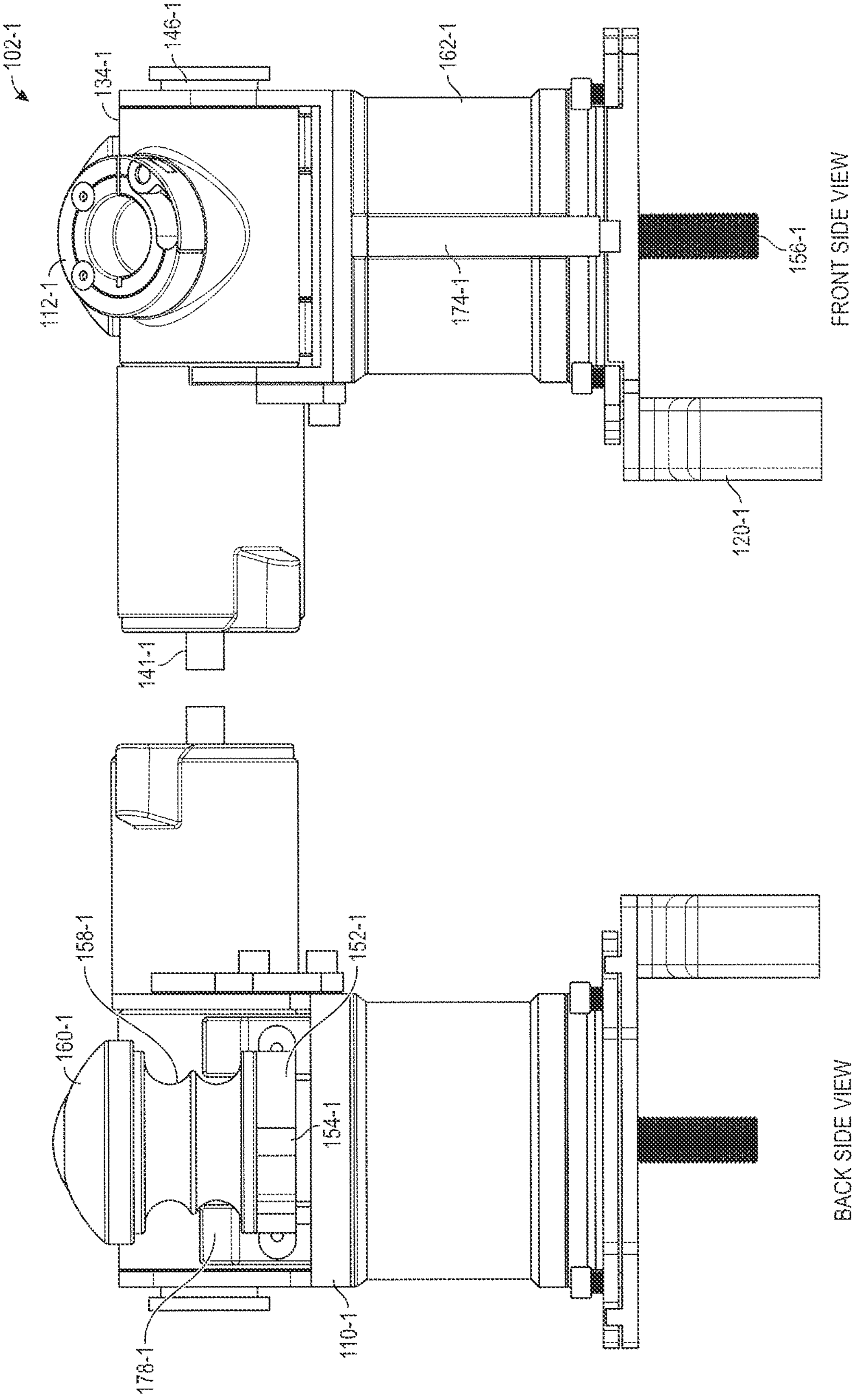
FIG. 6 illustrates front and back side views of the rope management apparatus, in accordance with various embodiments.
Figure 7:
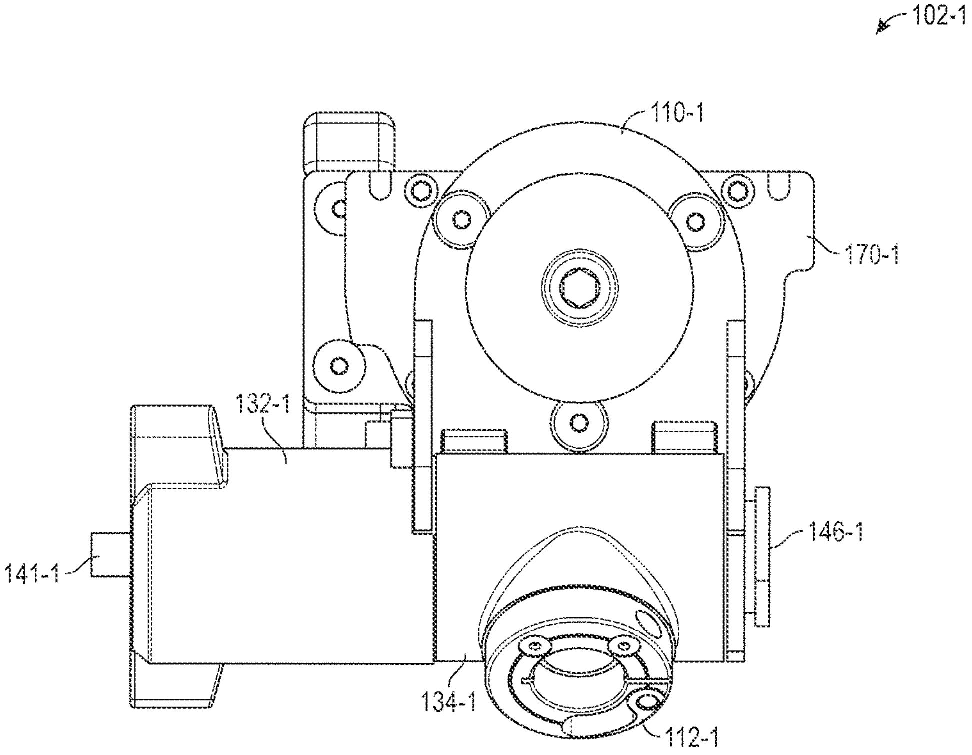
FIG. 7 illustrates top and bottom side views of the rope management apparatus, in accordance with various embodiments.
Figure 7:
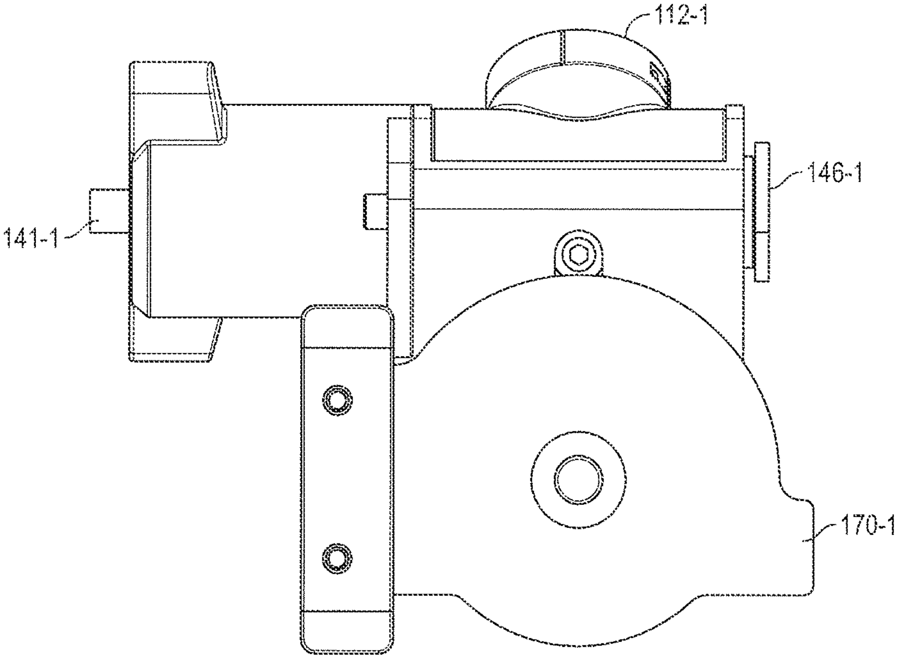

The next section will describe the rope management apparatus 102-1 with reference to FIGS. 4-7. FIG. 4 illustrates an exploded view of the rope management apparatus 102-1, FIG. 5 illustrates left and right side views of the rope management apparatus 102-1, FIG. 6 illustrates front and back side views of the rope management apparatus 102-1, and FIG. 7 illustrates top and bottom side views of the rope management apparatus 102-1.

Beginning with the lateral retraction unit 106-1, the lateral retraction unit 106-1 can include a lateral fixed carrier 132-1, a lateral rotating carrier 134-1, and resistive mechanism 138-1, which is illustrated as a torsion spring 136A-1. In some examples, the resistive mechanism 138-1 may be any suitable material, device, or the like that can assist in moving the retraction units 106-1 and 108-1. For example, the resistive mechanism 138-1 may include a mechanical gearbox, an electric motor, a resilient material (e.g., a bungee cord or other elastic material), an actuator, a constant force spring, a gas spring, a spring-loaded reel, and any other object capable of performing the functions described herein of the torsion springs 136-1. Preloading of the torsion springs 136-1 may be selected in order to provide the appropriate amount of compliance in the system 100-1. For example, the system 100-1 should return to the stowed position from the deployed position without going so quickly that the rope 128-1 and handle 130-1 are flung ahead. In particular, the return should be slow, smooth, and consistent across the entire range of movement. In some examples, the lateral retraction unit 106-1 may be configured for rotation between 45 degrees and 90 degrees using the resistive force i.e., spring force. In a particular example, the rotation may be about 60 degrees. In some examples, an example spring rate for the torsion spring 136A-1 may be between 1.5 lbf-in/deg and 5 lbf-in/deg. In a particular example, the spring rate may be about 2.8 lbf-in/deg. In some examples, the force preload of the spring 136A-1 may be between 250 lbf-in and 750 lbf-in. In a particular example, the force preload of the spring 136A-1 may be about 500 lbf-in. In some examples, the force max load of the spring 136A-1 may be between 500 lbf-in and 1000 lbf-in. In a particular example, the force max load of the spring 136A-1 may be about 670 lbf-in.

The lateral fixed carrier 132-1 may include a grooved surface 154-1 along a perimeter of a first end. The grooved surface 154-1 may mate with a corresponding notched surface 155-1 along a perimeter of a second end of the fixed carrier 110-1. This engagement may align the lateral fixed carrier 132-1 and help retain the lateral fixed carrier 132-1 in place. The lateral fixed carrier 132-1 may be configured to house and retain the torsion spring 136A-1. In practice, a first end of the torsion spring 136A-1 may be installed or otherwise held in the lateral fixed carrier 132-1 (e.g., inserted into an aperture within an interior body of the lateral fixed carrier 132-1) and a second end may be inserted into a channel 140-1, aperture, groove 154-1, or other comparable structure formed in the fixed carrier 110-1. The fixed carrier 110-1 may include a set of limiting blocks 178-1 (e.g., backstops) to limit rotational movement of the lateral rotating carrier 134-1 with respect to the fixed carrier 110-1. The lateral retraction unit 106-1 may also include a retaining pin 141-1 and a bearing 142-1. The retaining pin 141-1 may, at a distal end, include a set of threads that can be used to install the retaining pin 141-1 into the lateral rotating carrier 134-1 and, together with a plate at the end of the lateral fixed carrier 132-1, hold the torsion spring 136A-1 in place.

The lateral rotating carrier 134-1 may include the attachment point 112-1, a bushing 144, and a retainer 146-1. The lateral rotating carrier 134-1 may be characterized by a cylinder having openings on both ends and the attachment point extended from the cylindrical side of the cylinder. In practice, the lateral rotating carrier 134-1 is installed between legs of the fixed carrier 110-1. One end of the torsion spring 136A-1 extends through the channel 140-1 and is held within an aperture formed in an end of the lateral rotating carrier 134-1. In this manner, the resistive force of the torsion spring 136A-1 is transferred to the lateral rotating carrier 134-1. The retainer 146-1 may mate with corresponding threads within an end of the lateral rotating carrier 134-1, and may be used to retain the lateral rotating carrier 134-1 within the fixed carrier 110-1. The bushing 144-1 may add compliance and provide for smooth rotation. A comparable bushing 144-1 may be installed on the opposite side of the lateral fixed carrier 132-1 between the bearing 142-1 and body 162-1 of the lateral fixed carrier 132-1. The bushings may be formed from any suitable material such as Polyether ether ketone (PEEK).

It should be appreciated that while a single lateral fixed carrier 132-1 and torsion spring 136A-1 are illustrated as being used with the lateral rotating carrier 134-1, a second lateral fixed carrier 132-1 and torsion spring 136A-1 may be included and mounted on the opposite side of the fixed carrier 110-1. A second lateral fixed carrier 132-1 may be desirable when additional resistive forces are needed.

Turning now to the vertical retraction unit 108-1 in more detail, the vertical retraction unit 108-1 may include a vertical fixed carrier 148-1, a vertical rotating carrier 150-1, and a torsion spring 136B-1. The vertical fixed carrier 148-1 may take the form of an elongated shaft having an aperture formed axially therethrough. The vertical fixed carrier 148-1 may also include a shoulder 152-1 that includes a diameter that is larger than that of the main body of the elongated shaft. The shoulder 152-1 includes one or more grooves 154-1, which may also be apertures, channels, or other comparable structures configured to receive an end of the torsion spring 136B-1. When assembled, a bolt 156-1 may extend through the middle of the vertical fixed carrier 148-1 and be threaded into a tow point on a vessel 122-1 (e.g., on a tower 104-1). When the bolt 156-1 is tightened, the vertical fixed carrier 148-1 may retain the torsion spring 136B-1 in place using compression.

In some examples, the vertical retraction unit 108-1 may be configured for rotation of between 90 degrees and 180 degrees using the spring force. In a particular example, the rotation may be about 160 degrees. In some examples, an example spring rate for the torsion spring 136B-1 may be between 0.5 lbf-in/deg and 2 lbf-in/deg. In a particular example, the spring rate of the spring 136B-1 may be about 0.7 lbf-in/deg. In some examples, the force preload of the spring 136B-1 may be between 25 lbf-in and 100 lbf-in. In a particular example, the force preload of the spring 136B-1 may be about 40 lbf-in. In some examples, the force max load of the spring 136B-1 may be between 100 lbf-in and 200 lbf-in. In a particular example, the force max load of the spring 136B-1 may be about 150 lbf-in.

As the rope management apparatus 102-1 has been designed to replace standard tow points (e.g., those used to tow surfers, wake boarders, and the like), the rope management apparatus 102-1 may also include an auxiliary tow point 158-1 that together with a cap 160-1 may be mounted to a top side of the vertical retraction unit 108-1. The auxiliary tow point 158-1 functions as a standard tow point when the active rope management apparatus 102-1 is not being used.

Turning now to the vertical rotating carrier 150-1 in more detail, the vertical rotating carrier 150-1 may include a body 162-1, a yoke plate 164-1, a pair of drag plates 166-1, a limiting plate 168-1, and a fixed plate 170-1. The body 162-1 may take the form of a hollow cylinder with a set of threaded holes on a top side and a set of threaded holes on the bottom side, along with a limiting structure 174-1. The body 162-1 may be connected to the fixed carrier 110-1 using the set of threaded holes on the top side and may be connected to the fixed carrier 110-1 using the set of threaded holes on the bottom side. The body 162-1 may be configured to receive the vertical rotating carrier 150-1 and the torsion spring 136B-1. In particular, the body 162-1 may include a groove 154-1, aperture, channel, or other suitable structure for retaining one end of the torsion spring 136B-1.

As described above, the other end of the torsion spring 136B-1 may be inserted into one of the grooves 154-1 of the vertical fixed carrier 148-1. The pair of drag plates 166-1 may be installed between the limiting plate 168-1 and the yoke plate 164-1 to add friction to the system 100-1. This may slow down the rate at which the vertical rotating carrier 150-1 rotates from a deployed position to a stowed position, i.e., returns to the stowed position.

The drag plate 168-1 may couple with the fixed plate 170-1 to define a fixed structure. The drag plate 168-1 may include one or more screws, pins, or other structures that extend through holes in the top surface of the drag plate 168-1 and toward the fixed plate 170-1. These structures may be used to define rotational limits of the system 100-1, adjust level in the system 100-1, connect the drag plate 168-1 and the fixed plate 170-1, and/or perform other suitable functions. The drag plate 168-1 may define rotational limits of the system 100-1 using a set of stops 172-1 connected by an arcuate path. The limiting structure 174-1 of the body 162-1 may engage with the stops 172-1 to limit rotational movement of the vertical rotating carrier 150-1.

The fixed plate 170-1, which in some examples may be referred to as a mounting plate, may include an opening at its center to receive the bolt 156-1. Thus, the underside of the fixed plate 170-1 may rest upon a tower 104-1 or other structure within the vessel 122-1. The fixed plate 170-1 may also include a pair of holes 176-1 that can be used to secure the fixed plate 170-1 to the mounting bracket 120-1 using a set of screws, bolts, or the like. The mounting bracket 120-1 may include an interior arcuate surface configured to mate with or otherwise comply with a tubular surface of a tower 104-1. In some examples, the fixed plate 170-1 and/or the mounting bracket 120-1 may be configurable and/or otherwise tailored to the type of attachment location. For example, certain towers 104-1 may require a rounded or otherwise arcuate mounting bracket 120-1, while others may include a rectangular profile or planar surface upon which to mount.

Figure 8:
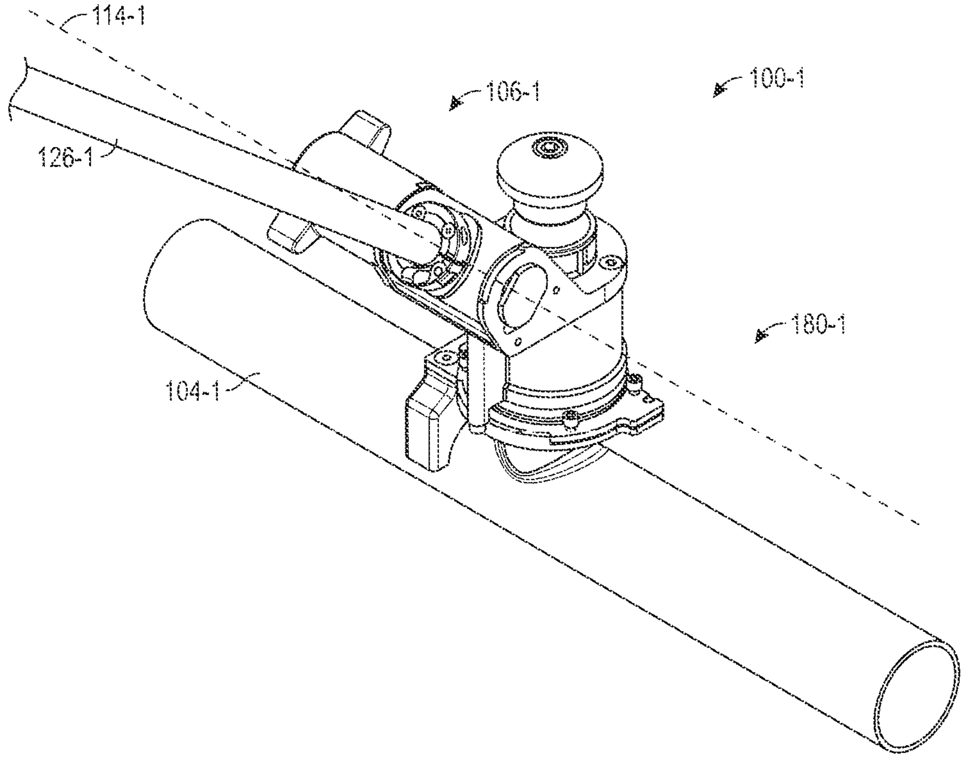
FIG. 8 illustrates the rope management system in various deployed and stowed positions, in accordance with various embodiments.
Figure 8:
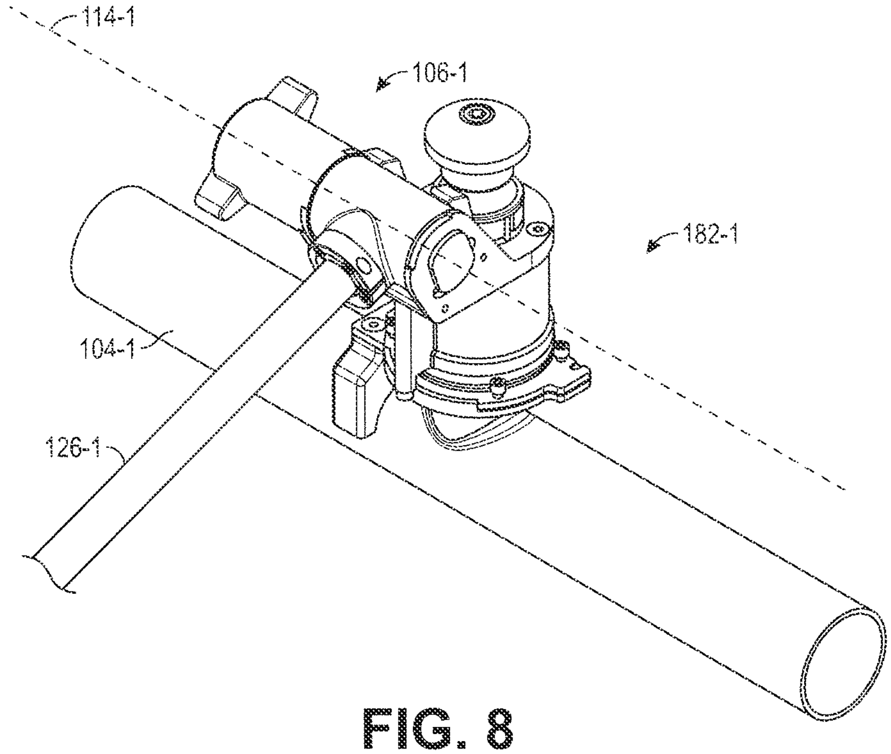

FIGS. 8 and 9 illustrate the rope management system 100-1 in various deployed and stowed positions. FIG. 8 depicts a lateral stowed position 180-1 and a lateral deployed position 182-1. As can be seen in these two positions 180-1, 182-1, a portion of the lateral retraction unit 106-1 rotates about the lateral axis 114-1 to reorientate to each position. In the lateral stowed position 180-1, the boom pole 126-1 is oriented towards the sky, e.g., above a plane defined by the top of the tower 104-1. In the lateral deployed position 182-1, the boom pole 126-1 is oriented toward the water, e.g., in a manner that intersects the plane defined by the top of the tower 104-1. This may be suitable for pulling a surfer behind the vessel 122-1.

Figure 9A:
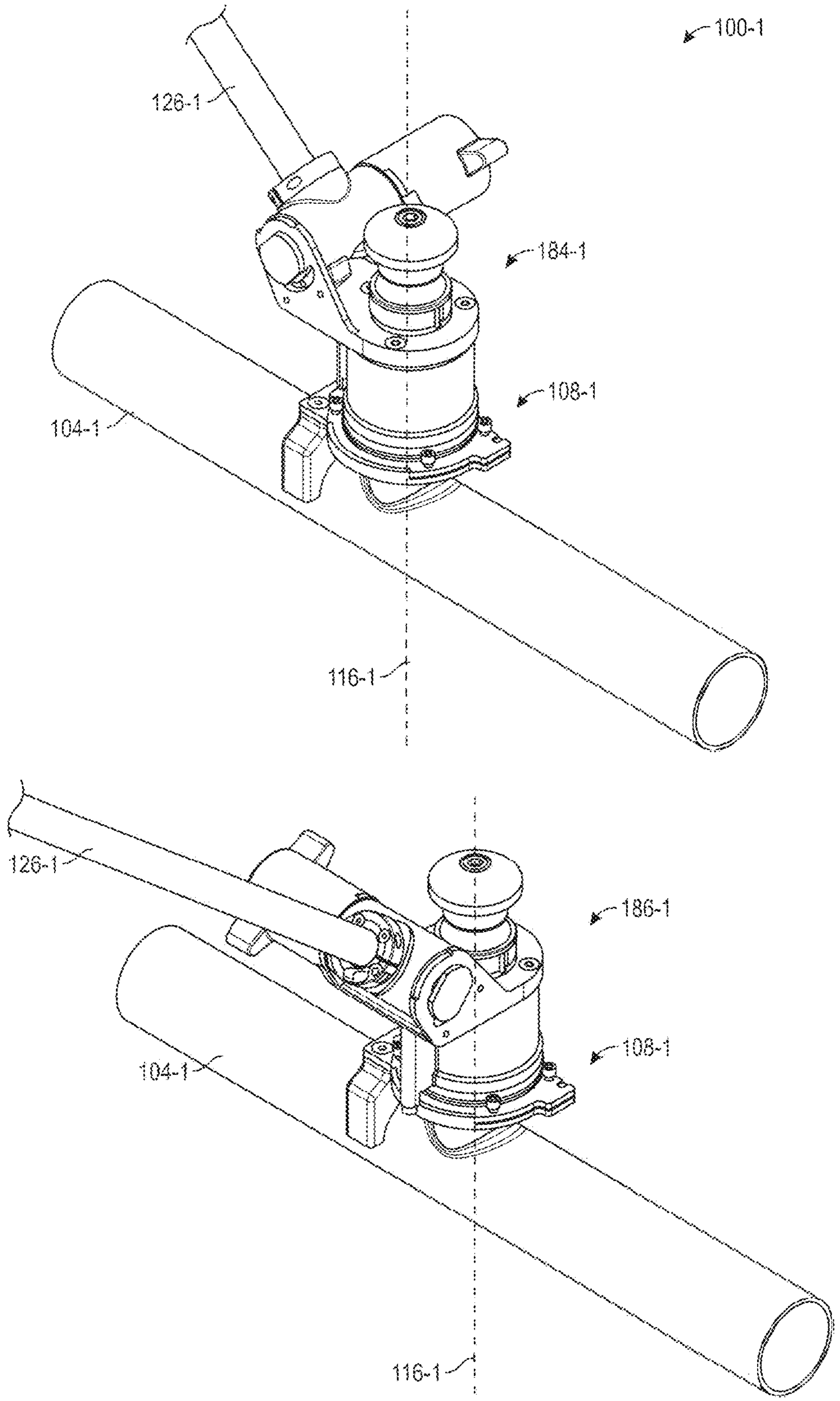
FIGS. 9A and 9B illustrate the rope management system in various deployed and stowed positions, in accordance with various embodiments.
Figure 9B:
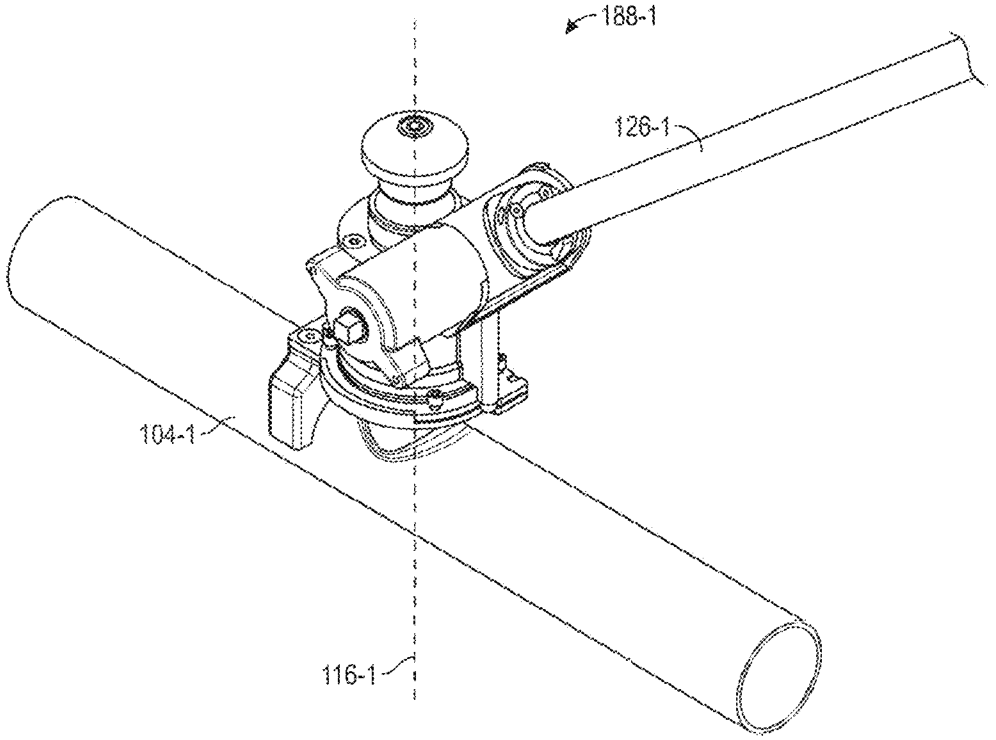

FIG. 9A depicts a first vertical stowed position 184-1 and a vertical deployed position 186-1. FIG. 9B depicts a second vertical stowed position 188-1. As can be seen in these three positions, a portion of the vertical retraction unit 106-1 rotates about the vertical axis 116-1 to reorientate to each position. In the first vertical stowed position 184-1, the boom pole 126-1 is oriented toward the port side of the vessel 122-1. Similarly, in the second vertical stowed position 188-1, the boom pole 126-1 is oriented toward the starboard side of the vessel 122-1. The orientation of the stowed position 184-1, 188-1 may change depending on whether the surfer is regular or goofy stance. In the stowed positions 184-1, 188-1, the boom pole 126-1 may be placed at the side of the vessel 122-1 in a manner that is suitable for the surfer to grab the handle 130-1 as the vessel 122-1 comes around. In the vertical deployed position 186-1, a portion of the vertical retraction unit 106-1 has rotated about the vertical axis 116-1 such that the boom pole 126-1 is oriented toward the stern of the vessel 122-1. This position may correspond to when the surfer is being pulled behind the vessel 122-1, thereby putting tension on the rope management system 100-1. The rope management system 100-1 may also be in the lateral deployed position 182-1 when the surfer is being pulled. Thus, the lateral deployed position 182-1 and the vertical deployed position 186-1 may occur at the same time (e.g., when tension is put on the rope 128-1). Likewise, the lateral stowed position 180-1 and vertical stowed positions 184-1, 188-1 may occur at the same time (e.g., when tension is not put on the rope 128-1).

Figure 10:
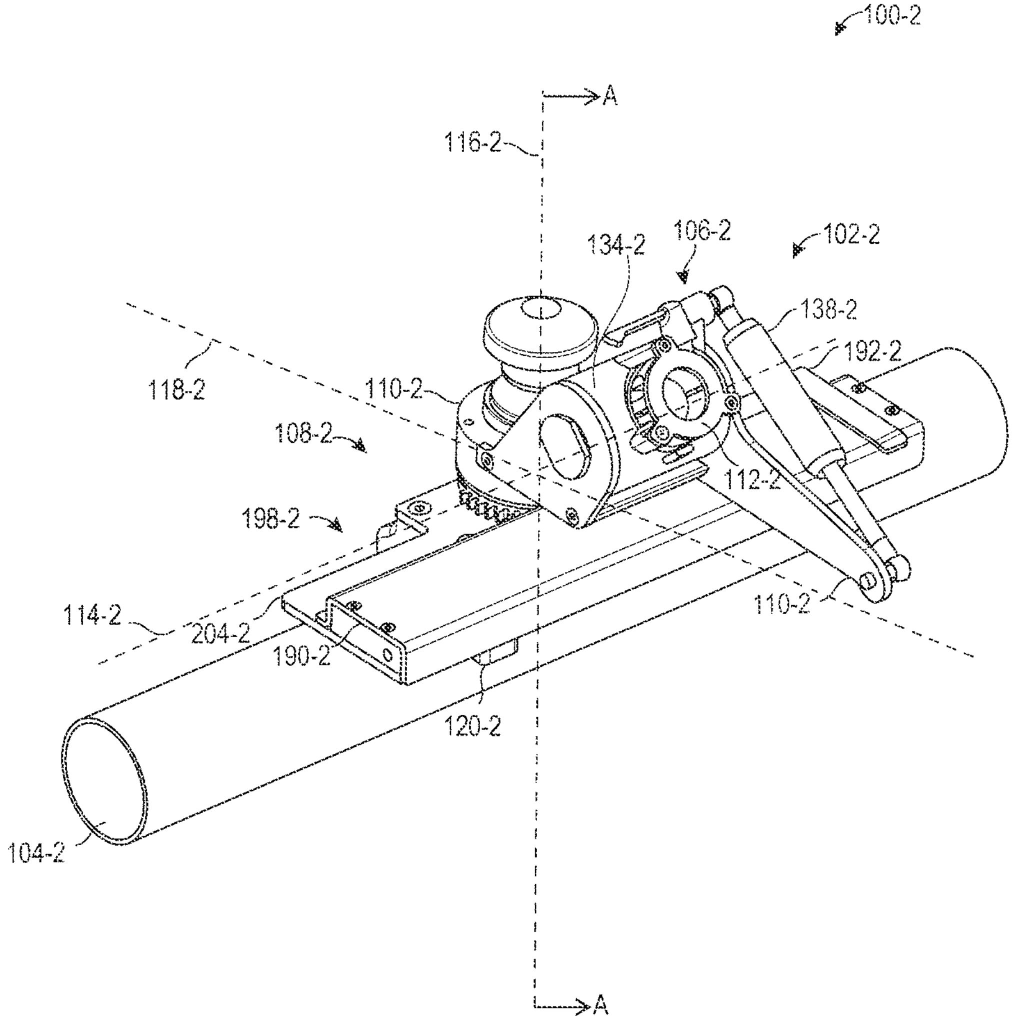
FIG. 10 illustrates another example rope management system, in accordance with various embodiments.

The next section describes another example rope management system 100-2 with reference to FIGS. 10-20, according to various examples. For example, FIG. 10 illustrates another example rope management system 100-2, according to at least one example. The rope management apparatus 102-2 may include a lateral retraction unit 106-2, a vertical retraction unit 108-2, and a mounting bracket 120-2. The lateral retraction unit 106-2 may be connected to the vertical retraction unit 108-2 via a fixed carrier 110-2. The lateral retraction unit 106-2 may include an attachment point 112-2 configured to receive a boom pole 126-2, rope 128-2, other compliant member to which a rope 126-2 may be connected, and/or any other suitable object used for towing users. Generally, the lateral retraction unit 106-2 may be configured to enable rotation of a portion of the lateral retraction unit 106-2 via a lateral axis 114-2 of the rope management apparatus 102-2 that extends across the vessel 122-2 from a right or starboard side to a left or port side. Generally, the vertical retraction unit 108-2 may be configured to enable rotation of a portion of the vertical retraction unit 108-2 via a vertical axis 116-2 of the rope management apparatus 102-2.

The lateral retraction unit 106-2 of the rope management apparatus 102-2 may include a fixed carrier 110-2, a lateral rotating carrier 134-2, and a resistive mechanism 138-2. As illustrated in FIG. 10, the resistive mechanism 138-2 may be a gas spring, or any suitable material, device, or the like that can assist in moving the retraction units 106-2, 108-2 or otherwise bias the retraction units 106-2, 108-2 into stowed positions. The resistive mechanism 138-2 of the lateral retraction unit 108-2 may be coupled to the fixed carrier 110-2 at a first end, such that the resistive mechanism 138-2 is anchored on the first end. The resistive mechanism 138-2 may further be coupled to the lateral rotating carrier 134-2 at a second end. In turn, the lateral retraction unit 106-2 may be configured to convert force exerted by the resistive mechanism 138-2 into rotational movement causing the lateral rotating carrier 134-2 to transition between positions 180-2, 182-2. For example, when a gas spring, coupled to a fixed carrier 110-2 and a lateral rotating carrier 134-2, expands and contracts, the exerted force can cause the lateral rotating carrier 134-2 to transition between the lateral stowed position 180-2 and the lateral deployed position 182-2. A transition from the lateral stowed position 180-2 to the lateral deployed position 182-2 may be resisted by the resistive mechanism 138-2, and a transition from the lateral deployed position 182-2 to the lateral stowed position 180-2 may be caused by the resistive mechanism 138-2. In some examples, the force output of the gas spring may be between 600N to 1000N. In particular examples, the force output of the gas spring may be 800N, less than 800N, or greater than 800N. The force of the resistive mechanism 138-2 of the lateral retraction unit 106-2 may be selected to control the speed and force at which the lateral retraction unit 106-2 moves from the deployed position to the stowed position and the force needed to rotate the lateral retraction unit 106-2 from the stowed position to the deployed position.

Figure 11A:
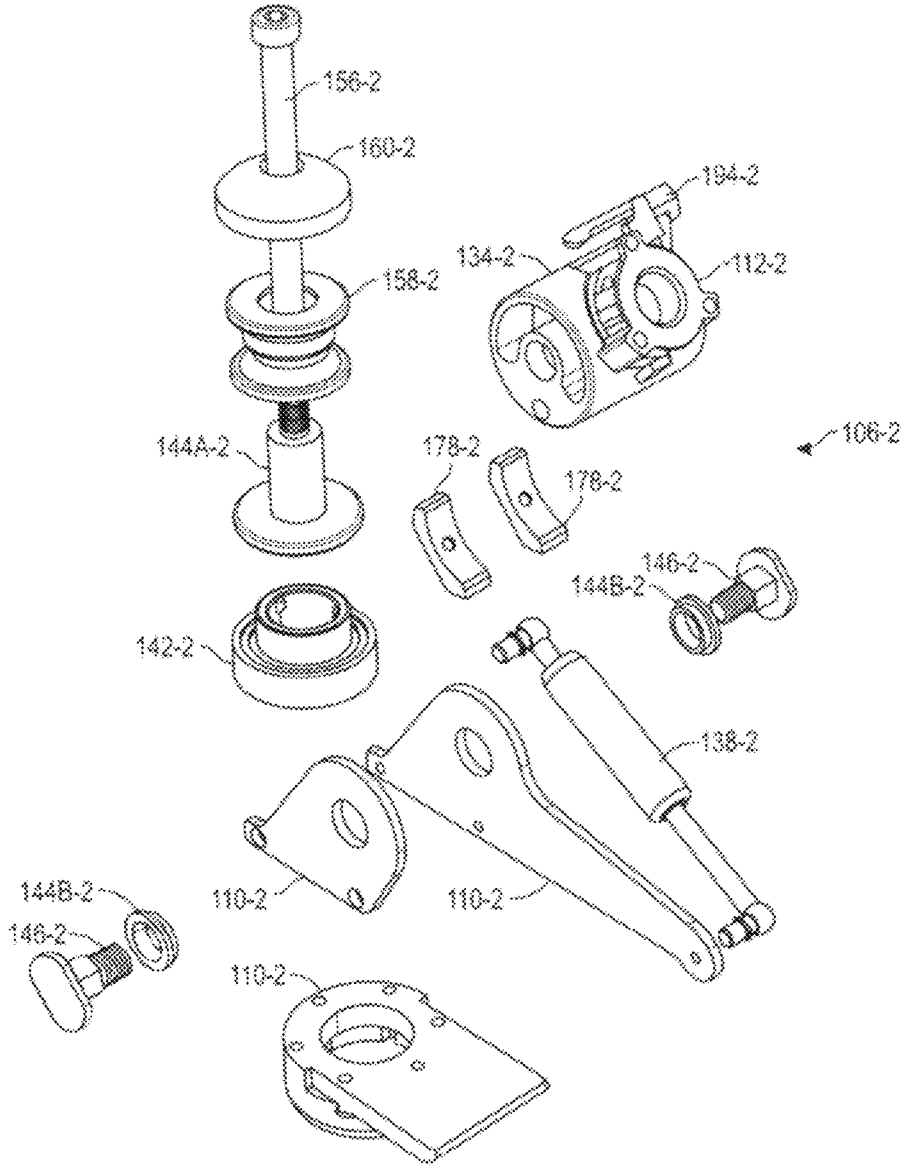
FIGS. 11A and 11B illustrate an exploded view of the rope management apparatus, in accordance with various embodiments.
Figure 11B:
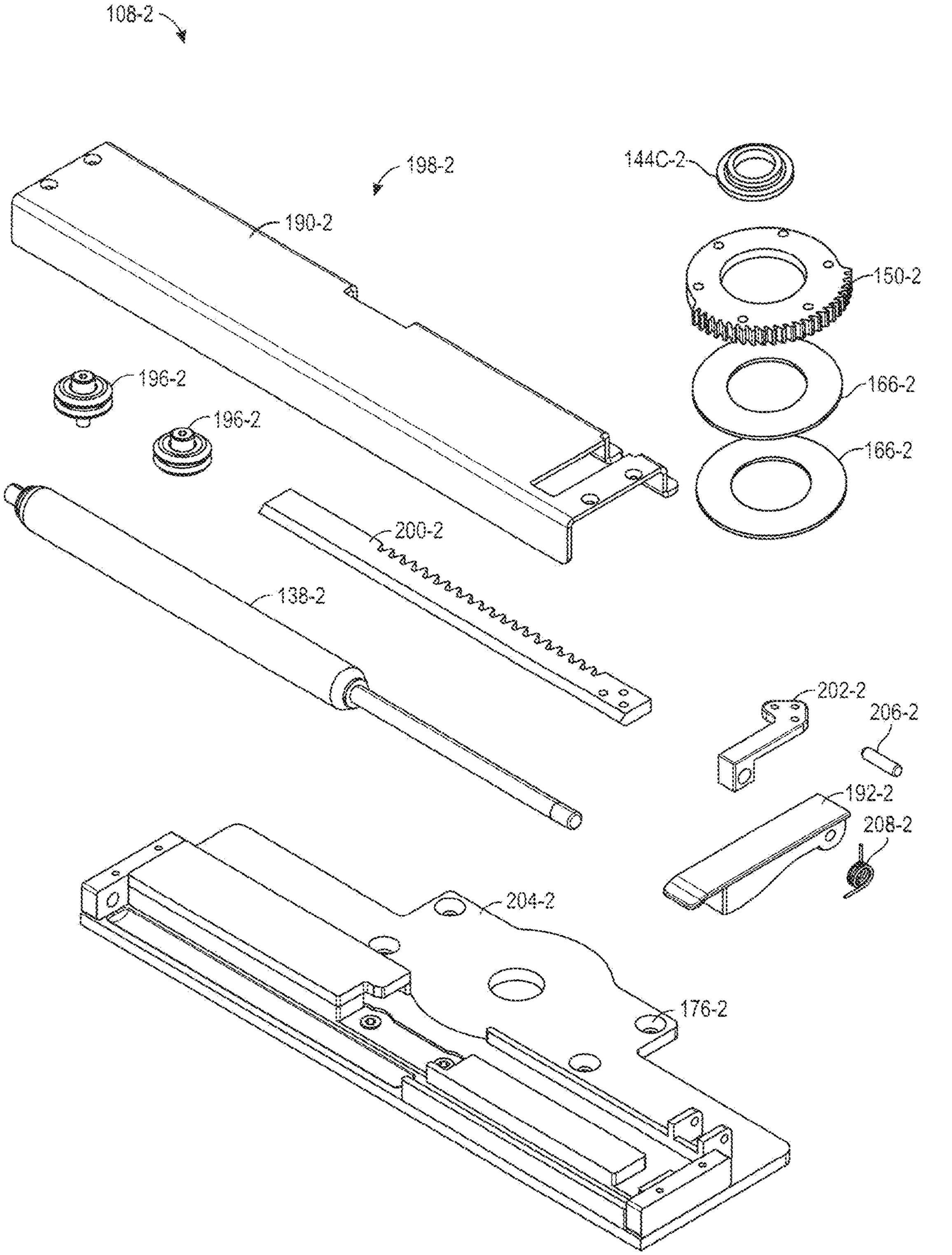
Figure 15:
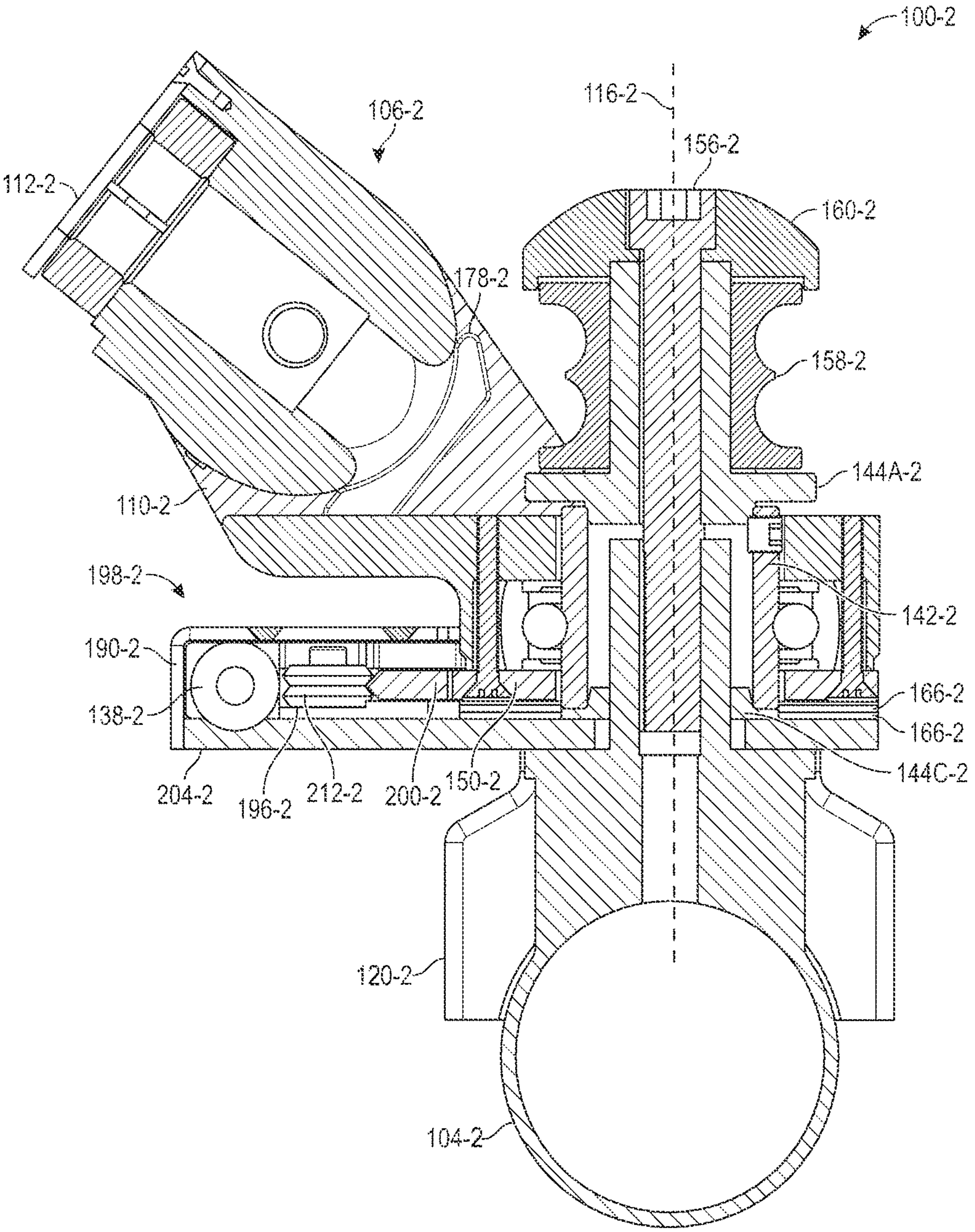
FIG. 15 illustrates a cross-sectional view along plane A-A as shown in FIG. 10, in accordance with various embodiments.

FIGS. 11A and 11B illustrates an exploded view of the rope management apparatus 102-2, in accordance with various embodiments. As previously discussed, since the rope management apparatus 102-2 may be designed to replace standard tow points (e.g., those used to tow surfers, wake boarders, and the like), the rope management apparatus 102-2 may also include an auxiliary tow point 158-2 that, together with a cap 160-2, may be mounted to a top side of the vertical retraction unit 108-2. The auxiliary tow point 158-2 can function as a standard tow point when the rope management apparatus 102-2 is not being used. The auxiliary tow point 158-2 and cap 160-2 may both centered to the bolt 156-2. In an embodiment, a bearing 142-2 and bushing 144A-2 may be located below the auxiliary tow point 158-2 and centered to the bolt 156-2. The bearing 142-2 may include one or more indentations configured to mate with bushing 144A-2 which may include a ramped surface. For example, the bushing 144A-2 can include a ramping design to align with the indentations of the bearing 142-2, such that, as the bolt 156-2 is tightened, the ramping of bushing 144A-2 can mate with the indentations of the bearing 142-2. In effect, as the bolt 156-2 is tightened, the bushing 144A-2 and the bearing 142-2 can easily align and center the rope management apparatus 102-2 on the tower 104-2. In some embodiments, the bushing 144A-2 and bearing 142-2 can be of varying sizes. For example, depending on the specifications of the tower 104-2 and/or vessel 122-2, different sized bushings 144A-2 and bearings 142-2 can be used to accommodate particular tower 104-2 and/or vessel 122-2 designs. As illustrated in FIG. 15, the bearing 142-2 may be mounted within an inner cavity of a body of a fixed carrier 110-2.

Figure 12:
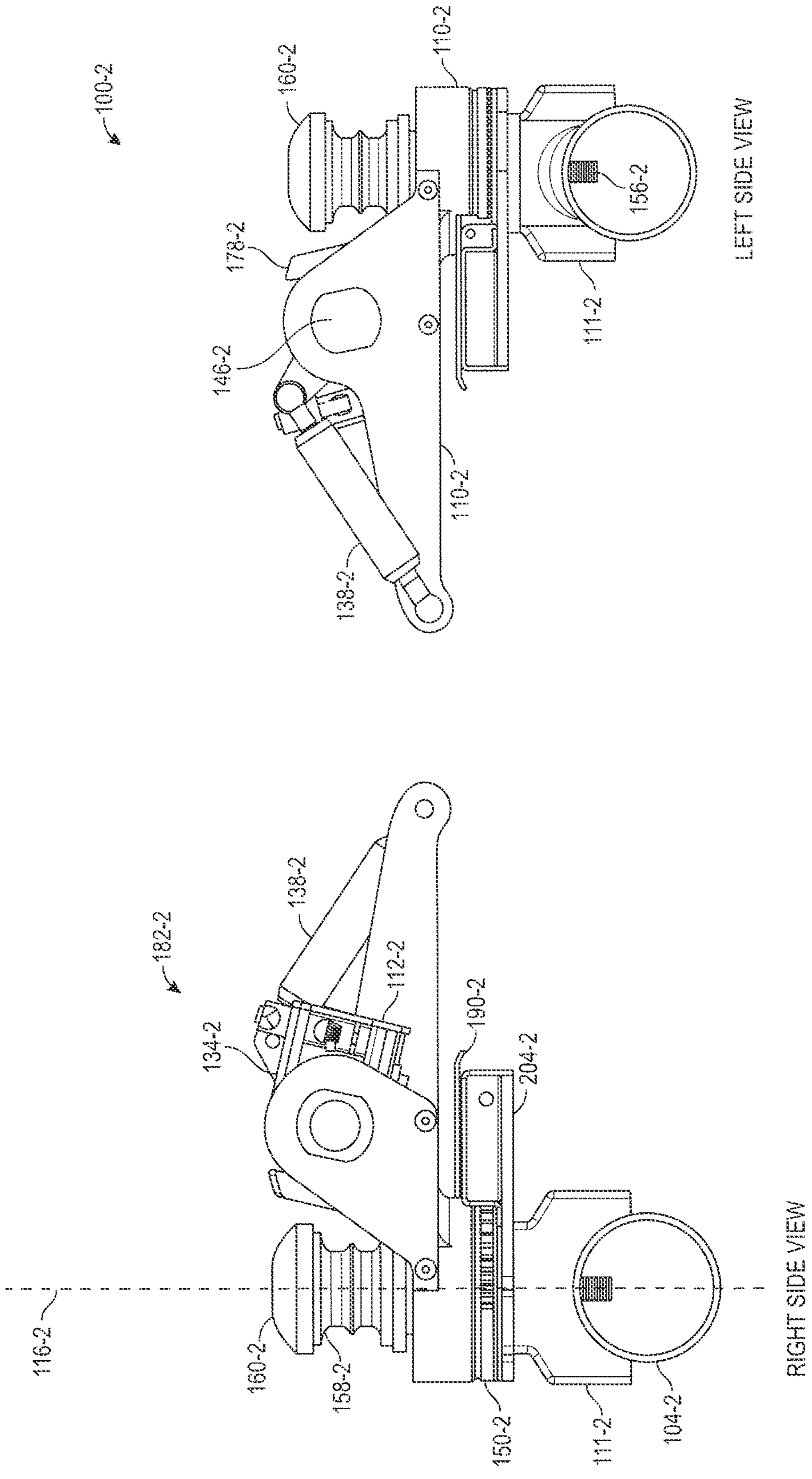
FIG. 12 illustrates left and right side views of the rope management system, in accordance with various embodiments.
Figure 13:
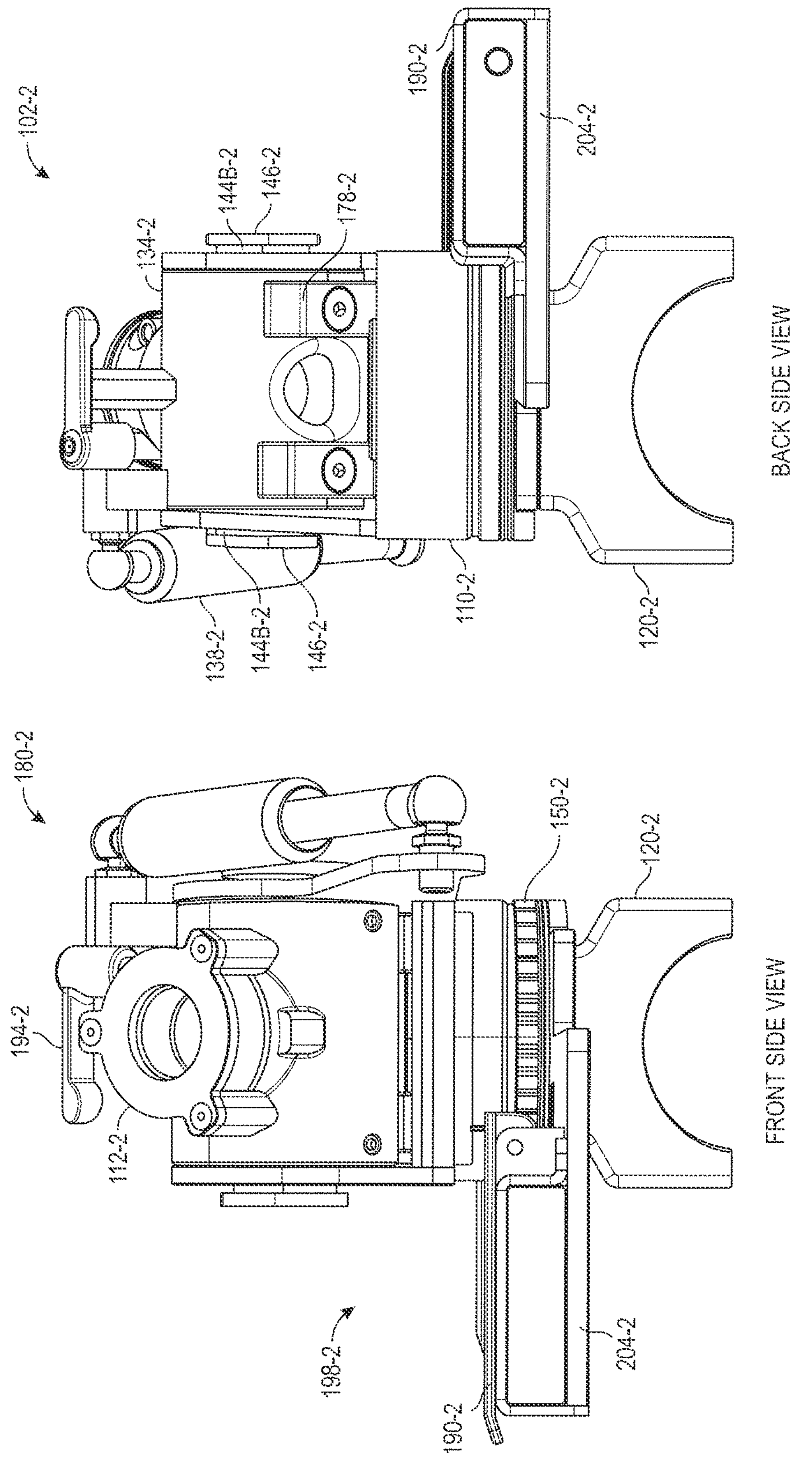
FIG. 13 illustrates front and back side views of the rope management apparatus, in accordance with various embodiments.

The lateral retraction unit 106-2 can include a lateral rotating carrier 134-2, a fixed carrier 110-2, bushings 144B-2, retainers 146-2, limiting blocks 178-2, and a resistive mechanism 138-2, which is illustrated as a gas spring. In practice, the lateral rotating carrier 134-2 is installed between legs of the fixed carrier 110-2. As illustrated in FIGS. 11A and 11B, the fixed carrier 110-2 may include two parallel portions (e.g., legs) and a body to which the legs are mounted. The body of the fixed carrier 110-2 may be configured to retain the bearing 142-2. One leg of the fixed carrier 110-2 may be configured to retain a first end of a resistive mechanism 138-2. In a further embodiment, at least one end of the resistive mechanism 138-2 may be connected to a leg of the fixed carrier 110-2, functionally anchoring one end of the resistive mechanism 138-2. A second end of the resistive mechanism 138-2 may, in turn, be connected to the lateral rotating carrier 134-2, as illustrated in FIG. 12. In this manner, the force of the resistive mechanism 138-2 can be transferred to the lateral rotating carrier 134-2, converting the force into rotational movement of the lateral rotating carrier 134-2. For example, as the restive mechanism 138-2 expands and contracts, the lateral rotating carrier 134-2 may rotate about the lateral axis 114-2. The fixed carrier 110-2 may further include a cylindrical portion configured to receive a bearing 142-2 and centered around the vertical axis 116-2. One or more retainers 146-2 may mate with corresponding threads within a first side and/or a second side of the lateral rotating carrier 134-2, and may be used to retain the lateral rotating carrier 134-2 within the fixed carrier 110-2. Bushing 144B-2 may be installed on the first side of the fixed carrier 110-2, in line with a retainer 146-2, to add compliance and provided for smooth rotation. A comparable bushing 144B-2 may be installed on the second side of the fixed carrier 110-2. For example, two comparable bushings 144B-2 can be installed on the fixed carrier 110-2 such that the lateral rotating carrier 134-2 is located between the two situated bushings 144B-2. In an embodiment, limiting blocks 178-2 can be placed and/or configured to restrain the rotational movement of the lateral rotating carrier 134-2 with respect to the fixed carrier 110-2. For example, as the lateral rotating carrier 134-2 is transitioned to a lateral stowed position 180-2, as illustrated in FIG. 13, the limiting blocks 178-2 may prevent the lateral rotating carrier 134-2 from rotating beyond a chosen angle, such as 90 degrees. In some examples, the lateral rotating carrier 134-2 can rotate vertically towards the sky up to 40 degrees with respect to the base plate 204-2 and vertically towards the ground up to 20 degrees with respect to the base plate 204-2. The limiting blocks 178-2 may be repositioned and/or removed to adjust the range of the rotational movement of the lateral rotating carrier 134-2.

The lateral rotating carrier 134-2 can include an attachment point 112-2 and a fastener 194-2. A fastener 194-2, such as the compression fitting illustrated in FIG. 11A, may be coupled to the attachment point 112-2. The fastener 194-2 can be designed to secure a compliant member, such as a boom pole 126-2, when the compliant member is connected to the attachment point 112-2. For example, once a boom pole 126-2 is inserted into the attachment point 112-2, the compression fitting can be engaged to secure the boom pole 126-2. To remove the boom pole 126-2, the compression fitting can be disengaged, allowing the boom pole 126 to be removed from the attachment point 112-2. It should be appreciated that while a compression fitting including a lever is illustrated in FIG. 11A as representative of a fastener 194-2, any suitable mechanism may be used to secure a compliant member inserted into the attachment point 112-2.

Turning to the vertical retraction unit 108-2, as illustrated in FIG. 11B, the vertical retraction unit 108-2 may include a vertical rotating carrier 150-2, one or more drag plates 166-2, bushing 144C-2, and a translating unit 198-2. In general, the translating unit 198-2 can resist the rotational movement of the vertical rotating carrier 150-2 via a laterally arranged resistive mechanism 138-2. The vertical rotating carrier 150-2 can be coupled to the translating unit 198-2. As described in more detail with respect to FIG. 16, the vertical rotating carrier 150-2 and the translating unit 198-2 may be coupled via interlocking teeth (e.g., gear teeth). Thus, when a rotational force is applied to the vertical rotating carrier 150-2, the rotational movement of the vertical rotating carrier 150-2 can be converted into lateral movement along the lateral axis 114-2 of the translating unit 198-2. The translating unit 198-2 may include a resistive mechanism 138-2, one or more rollers 196-2, a translating element 200-2, one or more backstops 192-2, a connector block 202-2, a top cover 190-2, and a base plate 204-2. In an embodiment, a resistive mechanism 138-2 may be included in the translating unit 198-2 and configured to provide lateral movement. The translating unit 198-2 and the rotational relationship to the vertical rotating carrier 150-2 is described in more detail with respect to FIGS. 16-18.

Figure 14:
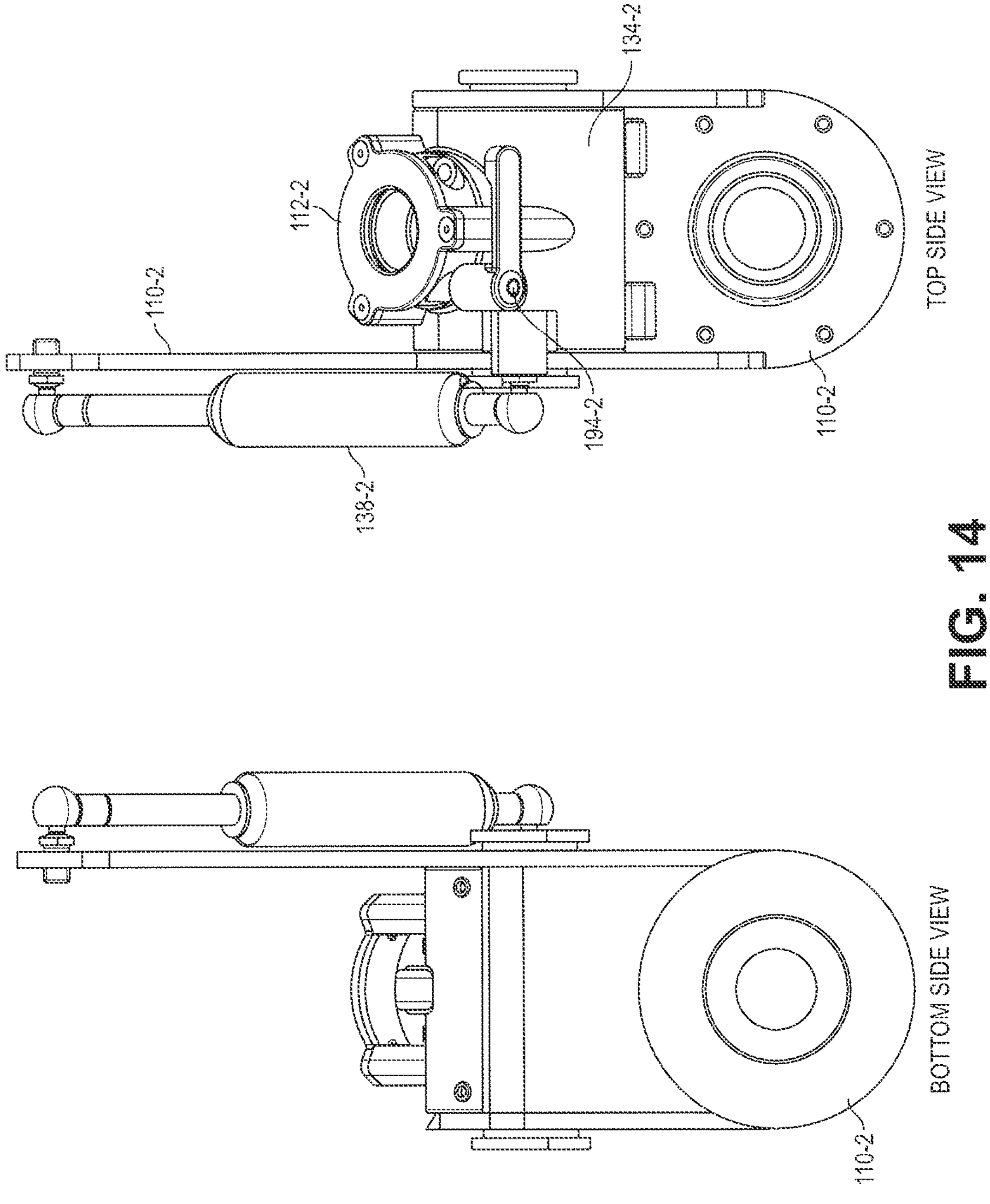
FIG. 14 illustrates top and bottom side views of the rope management apparatus excluding the translating unit, in accordance with various embodiments.

FIG. 12 illustrates left and right side view of the rope management system 100-2, FIG. 13 illustrates front and back side views of the rope management apparatus 102-2, and FIG. 14 illustrates top and bottom side views of the rope management apparatus 102-2 excluding the translating unit 198-2, in accordance with various embodiments. The vertical rotating carrier 150-2 can be coupled to the fixed carrier 110-2 and one or more drag plates 166-2. As depicted in FIGS. 12-15, a pair of drag plates 166-2 may be installed between the base plate 204-2 and the vertical rotating carrier 150-2 to add friction to the system. This may slow down the rate at which the vertical rotating carrier 150-2 rotates between positions. In some embodiments, the fixed carrier 110-2, the vertical rotating carrier 150-2, the pair of drag plates 166-2, and the bushing 144C-2 can be centered on the vertical axis 116-2.

FIG. 15 illustrates a cross-sectional view along plane A-A as shown in FIG. 10, in accordance with various embodiments. As illustrated, a portion of the lateral retraction unit 106-2 and the vertical retraction unit 108-2 may be centered on a vertical axis 116-2. The cap 160-2, auxiliary tow point 158-2, bearing 142-2, bushings 144A-2 and 144C-2, a portion of the fixed carrier 110-2, the vertical rotating carrier 150-2, and drag plates 166-2 can be designed to be centered on the vertical axis 116-2 and to receive the bolt 156-2 to anchor the rope management apparatus 102-2 at a suitable location on the vessel 122-2, such as the tower 104-2. The base plate 204-2 may be positioned such that the underside of the base plate 204-2 rests upon a tower 104-2 or any other suitable structure within the vessel 122-2. The base plate 204-2 may include a set of holes 176-2, illustrated in FIG. 11B, that can be used to secure base plate 204-2 to the mounting bracket 120-2 using a set of screws, bolts, or the like. In an embodiment, the mounting bracket 120-2 can be configured to mate with or otherwise comply with a surface of a tower 104-2 or an alternative attachment location. For example, the mounting bracket 120-2 may include an interior arcuate surface configured to mate with or otherwise comply with a tubular surface of a tower 104-2. The mounting bracket 120-2 can be designed to include an interior surface of varying shapes to comply with assorted tower designs. Additionally or alternatively, the base plate 204-2 may be configurable and/or otherwise tailored to the type of attachment location. For example, a base plate 204-2 with a curvature may be designed to accommodate a tower 104-2 with a curved profile. In some examples, the base plate 204-2 may be connected to the mounting bracket 120-2, which in turn may be attached to a tower 104-2 or any suitable location on a vessel 122-2. Alternatively, the base plate 204-2 may be attached directly to the tower 104-2 or any suitable location on a vessel 122-2. In an embodiment, a bushing 144C-2 may be located between the base plate 204-2 and a bearing 142-2. The bushing 144C-2 may engage with the bearing 142-2 while the bottom side of the bushing resides on the base plate 204-2. As previously discussed, the bushings 144-2 may be formed from any suitable material such as Polyether ether ketone (PEEK).

Figure 16:
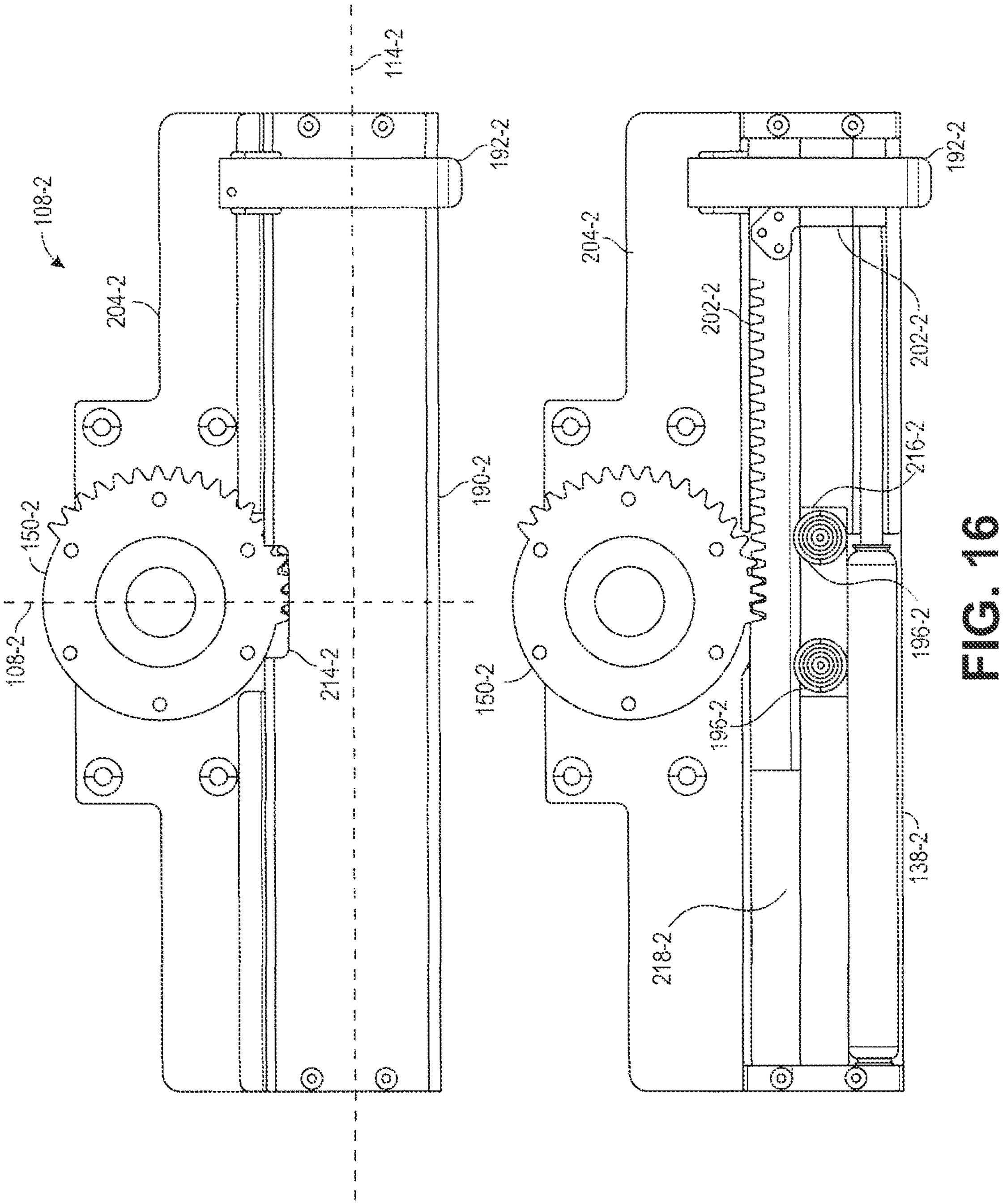
FIG. 16 illustrates a top view with a top cover and a top view without a top cover of the vertical retraction unit, in accordance with various embodiments.

FIG. 16 illustrates a top view with a top cover 190-2 and a top view without a top cover 190-2 of the vertical retraction unit 108-2, in accordance with various embodiments. As previously described, the vertical rotating carrier 150-2 can be coupled to a translating unit 198-2 and configured to provide rotation for the vertical retraction unit 108-2. By coupling the vertical rotating carrier 150-2 to the translating unit 198-2, rotational movement caused by force exerted on the vertical rotating carrier 150-2 can be restrained via a resistive mechanism 138-2 of the translating unit 198-2. The translating unit 198-2 can include a top cover 190-2 connected to the base plate 204-2. The top cover 190-2 can be designed to include an opening 214-2 on a side allowing the vertical rotating carrier 150-2 to mate with a translating element 200-2 situated on the base plate 204-2. As illustrated in FIG. 16, the translating element 200-2 may be located in a lateral groove 218-2 of the base plate 204-2. The vertical rotating carrier 150-2 and the translating element 200-2 may include teeth designed to interlock or physically mesh. The translating element 200-2 may then be mated to the vertical rotating carrier 150-2 via interlocking teeth. In turn, the vertical rotating carrier 150-2 and the translating element 200-2 may function as a rack and pinion gear set converting rotational movement of the pinion gear, i.e., the vertical rotating carrier 150-2, to lateral movement of the rack gear, i.e., the translating element 200-2. A resistive mechanism 138-2 may be included in the translating unit 198-2. As illustrated in FIG. 16, the resistive mechanism 138-2 can be located on the base plate 204-2 and positioned along the lateral axis 114-2. Moreover, a connector block 202-2 attached to the translating element 200-2 may be paired to the resistive mechanism 138-2. Thus, when the resistive mechanism 138-2 exerts a force on the connector block 202-2, the force can be converted into lateral movement of the translating element 200-2. In an example, the force exerted by the resistive mechanism 138-2 can oppose the rotational movement of the vertical rotating carrier 150-2, acting as a restraint on the rotational motion about the vertical axis 116-2 of the rope management system 100-2.

As illustrated in FIG. 16, the resistive mechanism 138-2 can be a gas spring, however, the resistive mechanism 138-2 can be any suitable material, device, or the like that can assist in moving the translating element 200-2. In the case of the resistive mechanism 138-2 being a gas spring, the force output of the lateral moving gas spring can vary. In some examples, the force output of the gas spring may be between 100N to 400N. In a particular example, the force output of the gas spring may be 350N. In another example, the force output of the gas spring may be 150N. In further embodiments, the resistive mechanism 138-2 may be an automated unit, such as a mechanical gearbox, actuator, an electric motor, or other suitable mechanism. For example, one or more servomotors may be used in the rope management apparatus 102-2 where precise control of the movement of one or both of the retraction units 106-2, 108-2 can be achieved.

As previously discussed, the translating element 200-2 can be paired to a connector block 202-2 at a first end. The connector block 202-2 can be located on the base plate 204-2, such that the translating element 200-2 and the connector block 202-2 move across the base plate 204-2 along the lateral axis 114-2. The connector block 202-2 can be positioned between a backstop 192-2 and a raised surface 216-2 of the base plate 204-2. Thus, as the connector block 202-2 moves along the lateral axis 114-2, the lateral motion of the connector block 202-2 will be limited by the backstop 192-2 and/or the raised surface 216-2. This configuration of the connector block 202-2 may, in effect, limit the range of lateral motion of the translating element 200-2 and, in turn, limit the range of rotational movement of the vertical rotating carrier 150-2. As discussed further with respect to FIG. 18, the backstop 192-2 can be engaged and disengaged. When the backstop 192-2 is engaged, the connector block 202-2 will abut the backstop 192-2, preventing further travel along the lateral axis 114-2 in the direction of the backstop 192-2. When the backstop 192-2 is disengaged, the connector block 202-2 may travel past the backstop 192-2 until the connector block 202-2 abuts a side of the base plate 204-2.

The translating unit 198-2 may further include one or more rollers 196-2. The rollers 196-2 can be designed to engage with a profile edge of the translating element 200-2. For example, the rollers 196-2 may include a roller channel 212-2, illustrated in FIG. 15, which an edge of the translating element 200-2 can engage with. When engaged with the translating element 200-2, the one or more rollers 196-2 can further add compliance and provide smooth lateral movement of the translating element 200-2 and, in turn, smooth rotation of the vertical rotating carrier 150-2. Moreover, the rollers 196-2 may provide alignment and added pressure between the vertical rotating carrier 150-2 and the translating element 200-2. In an example, when an edge of the translating element 200-2 is engaged with the roller channels 212-2 of the rollers 196-2, pressure being applied through the vertical rotating carrier 150-2 to the translating element 200-2 will load to the rollers 196-2. As a result, the translating element 200-2 will remain positioned between the rollers 196-2 and the vertical rotating carrier 150-2, as well as, parallel to the vertical rotating carrier 150-2. For example, a pair of rollers 196-2 may be in contact with the translating element 200-2, thus, when the translating element 200-2 moves, the rollers 196-2 can ensure that the movement of the translating element 200-2 remains along the lateral axis 114-2.

Figure 17:
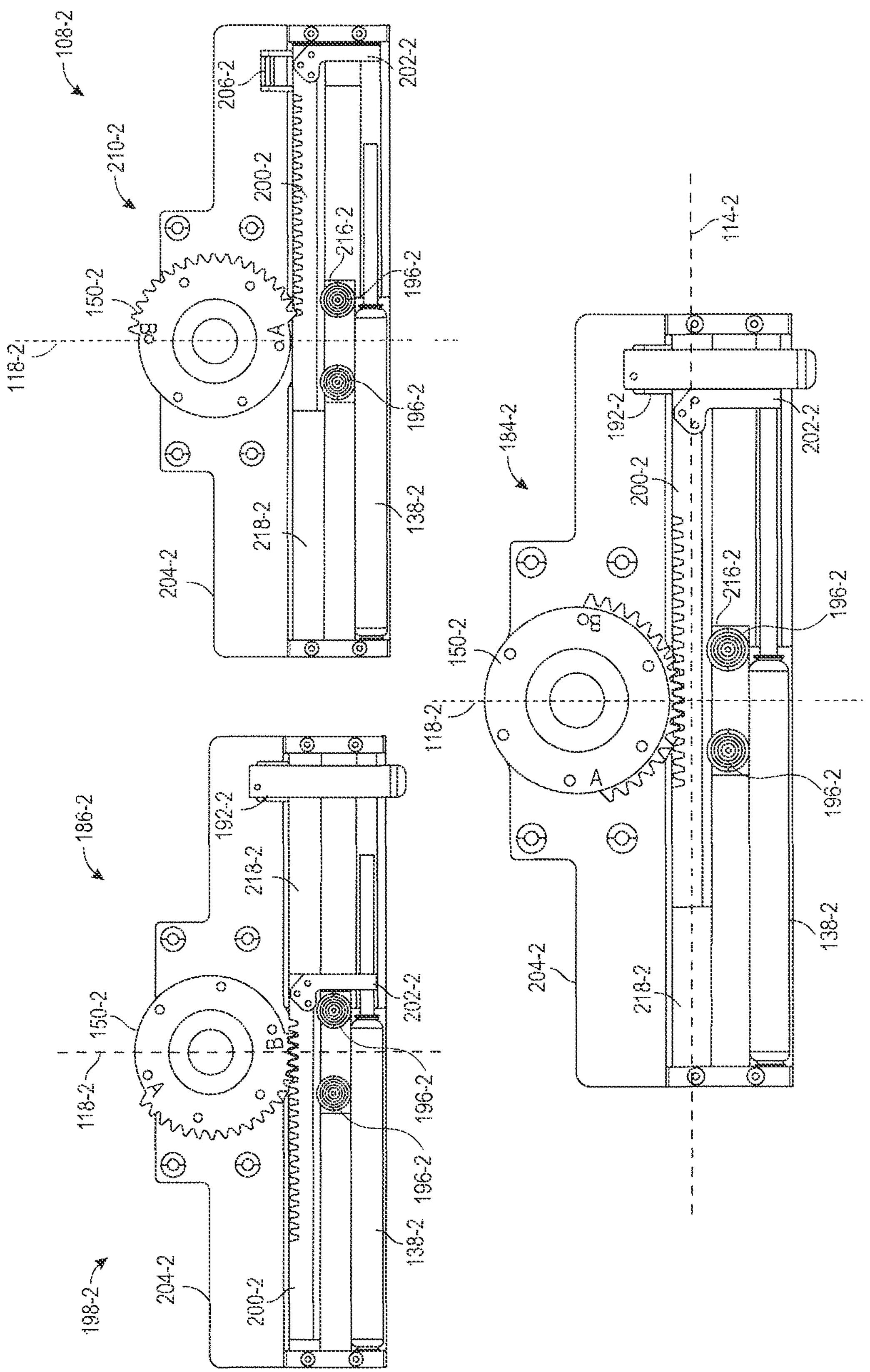
FIG. 17 illustrates the vertical retraction unit in various deployed and stowed positions, in accordance with various embodiments.

The following section describes the rotation of the vertical retraction unit 108-2 with respect to reference letters A and B depicted on the vertical rotating carrier 150-2 illustrated in FIG. 17. The vertical retraction unit 108-2 can be designed to rotate to various deployed and stowed positions. In particular, the vertical retraction unit 108-2 may rotate to positions including, but not limited to, a vertical stowed position 184-2, a vertical deployed position 186-2, and a disengaged position 210-2. As illustrated in these three positions, the vertical retraction unit 108-2 can enable rotation of the attached lateral retraction unit 106-2 about the vertical axis 116-2 via the vertical rotating carrier 150-2. As the vertical rotating carrier 150-2 rotates, the translating element 200-2 will travel along the lateral axis 114-2. In the vertical deployed position 186-2, the connector block 202-2 moves between the backstop 192-2 and the longitudinal axis 118-2, of which the vertical rotating carrier 150-2 is centered on. Moreover, the vertical rotating carrier 150-2 rotates from a position where reference A is approximately in line with the longitudinal axis 118-2 to a position where reference B is approximately in line with the longitudinal axis 118-2. As the translating unit 198-2 and the connector block 202-2 moves from the backstop 192-2 towards the longitudinal axis 118-2, the vertical rotating carrier 150-2 rotates clockwise from reference A to reference B. As the vertical rotating carrier 150-2 rotates from reference A to B, a lateral force may be applied to the resistive mechanism 138-2. For example, as the vertical rotating carrier 150-2 rotates and the connector block 202-2 travels towards the longitudinal axis 118-2, the gas spring illustrated in FIG. 17 is compressed. In an example, when a boom pole 126-2 including a rope 128-2 and a handle 130-2 is connected to the rope management apparatus 102-2 and a force is applied to the handle 130-2, the resistive mechanism 138-2 is compressed causing the vertical rotating carrier 150-2 to rotate into a vertical deployed position 186-2. In the vertical stowed position 184-2, the vertical rotating carrier 150-2 rotates to a position where neither reference A nor B are in line with the longitudinal axis 118-2 and, instead, reference A and B are approximately equidistant from the longitudinal axis 118-2, as depicted in FIG. 17. Furthermore, in the vertical stowed position 184-2, the connector block 202-2 abuts the backstop 192-2 as the resistive mechanism 138-2 overcomes any applied force and extends until abutting the backstop 192-2. In an example, when a boom pole 126-2 including a rope 128-2 and a handle 130-2 is connected to the rope management apparatus 102-2 and no additional force is being applied to the handle 130-2, the resistive mechanism 138-2 is fully extended and the vertical rotating carrier 150-2 is positioned in a vertical stowed position 184-2. In the disengaged position 210-2, the vertical rotating carrier 150-2 rotates counterclockwise to a position where reference A and B are approximately in line with the longitudinal axis 118-2. In the disengaged position 210-2, the connector block 202-2 has moved past a disengaged backstop 192-2 and abuts a side of the base plate 204-2. As the vertical retraction unit 108-2 translates between positions 184-2 and 186-2, the vertical rotating carrier 150-2 can be configured to rotate between varying degrees of rotation while still maintaining engagement with the translating element 200-2. In particular examples, the vertical rotating carrier 150-2 can rotate up to 144 degrees. In some examples, the vertical rotating carrier 150-2 can rotate up to 180 degrees. In particular examples, the vertical rotating carrier 150-2 can rotate up to 270 degrees.

Figure 18:
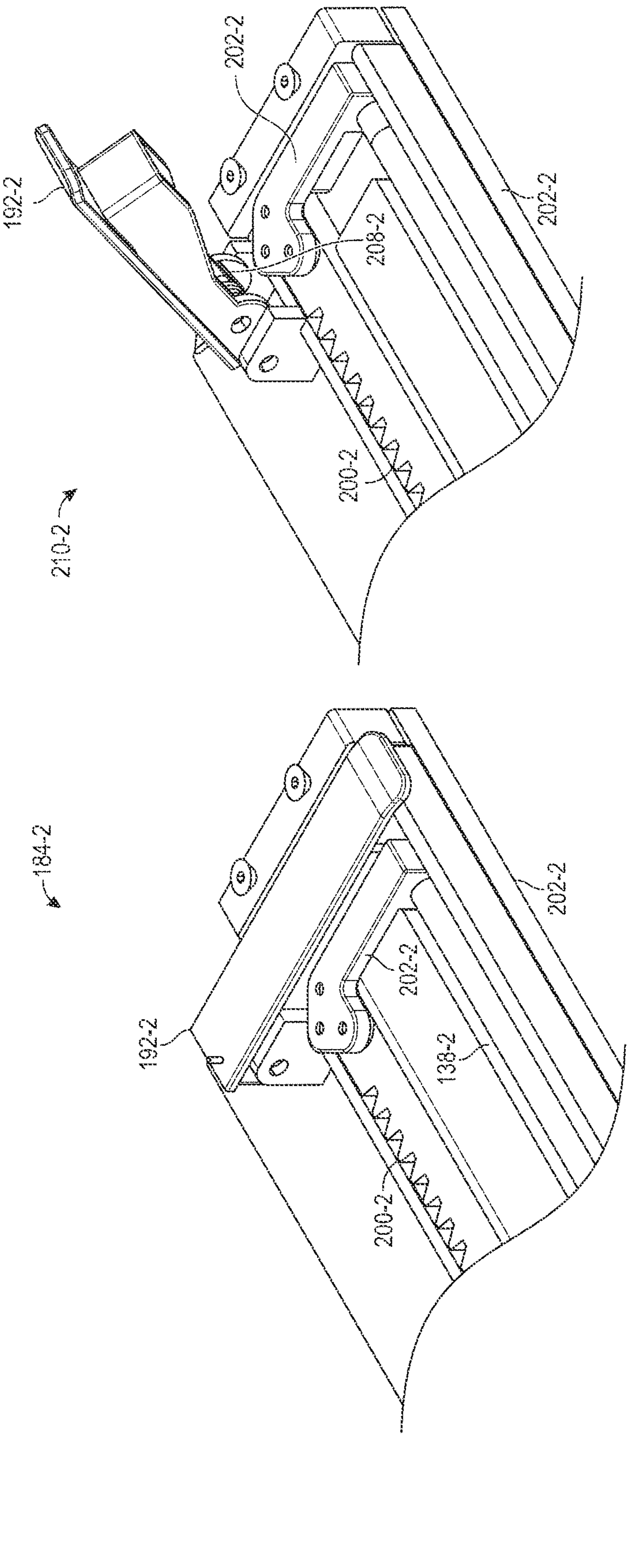
FIG. 18 illustrates an engaged and disengaged backstop of the vertical retraction unit, in accordance with various embodiments.

FIG. 18 illustrates an engaged and disengaged backstop 192-2 of the vertical retraction unit 108-2, in accordance with various embodiments. The backstop 192-2 may further include a pin 206-2 and a spring 208-2 allowing the backstop 192-2 to be lifted and lowered. In some embodiments, lifting the backstop 192-2 can cause the vertical rotating carrier 150-2 to be disengaged from the translating element 200-2. In an example, when the backstop 192-2 is disengaged, the force exerted on the connector block 202-2 by the resistive mechanism 138-2 may push the connector block 202-2 and translating element 200-2 past the backstop 192-2, disengaging the vertical rotating carrier 150-2 from the translation element 200-2. For example, when the backstop 192-2 is lifted, the connector block 202-2 is pushed past the backstop 192-2 by the gas spring. In some embodiments, the resistive mechanism 138-2 may fully extend and/or the connector block 202-2 may abut a side of the base plate 204-2. When the connector block 202-2 moves past the backstop 192-2, the teeth of the translating element 200-2 may separate from the teeth of the vertical rotating carrier 150-2, effectively disengaging the vertical rotating carrier 150-2 from the translating element 200-2. When disengaged, the vertical rotating carrier 150-2 may be freely rotated around the vertical axis 116-2. By disengaging the vertical rotating carrier 150-2, the rope management apparatus 102-2 can be used as a traditional tow point. In an embodiment, once the vertical rotating carrier 150-2 is disengaged and rotated to a desired position, a pin may be used to hold the vertical rotating carrier 150-2 in place. For example, the vertical rotating carrier 150-2 can be disengaged and rotated around the vertical axis 116-2 to be reorientated towards the stern of the vessel 122-2. A pin may then be inserted into the vertical retraction unit 108-2 to hold the unit 108-2 in place and keep the rope management apparatus 102-2 out of the way when using the tow point for other sports activities.

The backstop 192-2 may be reengaged by moving the translating element 200-2 and the connector block 202-2 along the lateral axis 114-2 towards the longitudinal axis 118-2, depicted in FIG. 17. In some embodiments, a spring 208-2 may be included causing the backstop 192-2 to automatically lower once the connector block 202-2 and translating element 200-2 have moved back along the lateral axis 114-2. Additionally or alternatively, the backstop 192-2 may be manually lowered into an engaged position once the connector block 202-2 and translating element 200-2 have moved back along the lateral axis 114-2. When the connector block 202-2 and the translating element 200-2 are moved allowing the backstop 192-2 to engage, the teeth of the translating element 200-2 and the vertical rotating carrier 150-2 may once again interlock. Once the backstop 192-2 is reengaged, the rotation of the vertical retraction unit 108-2 can once again be limited to a particular range of rotation about the vertical axis 116-2.

Figure 19:
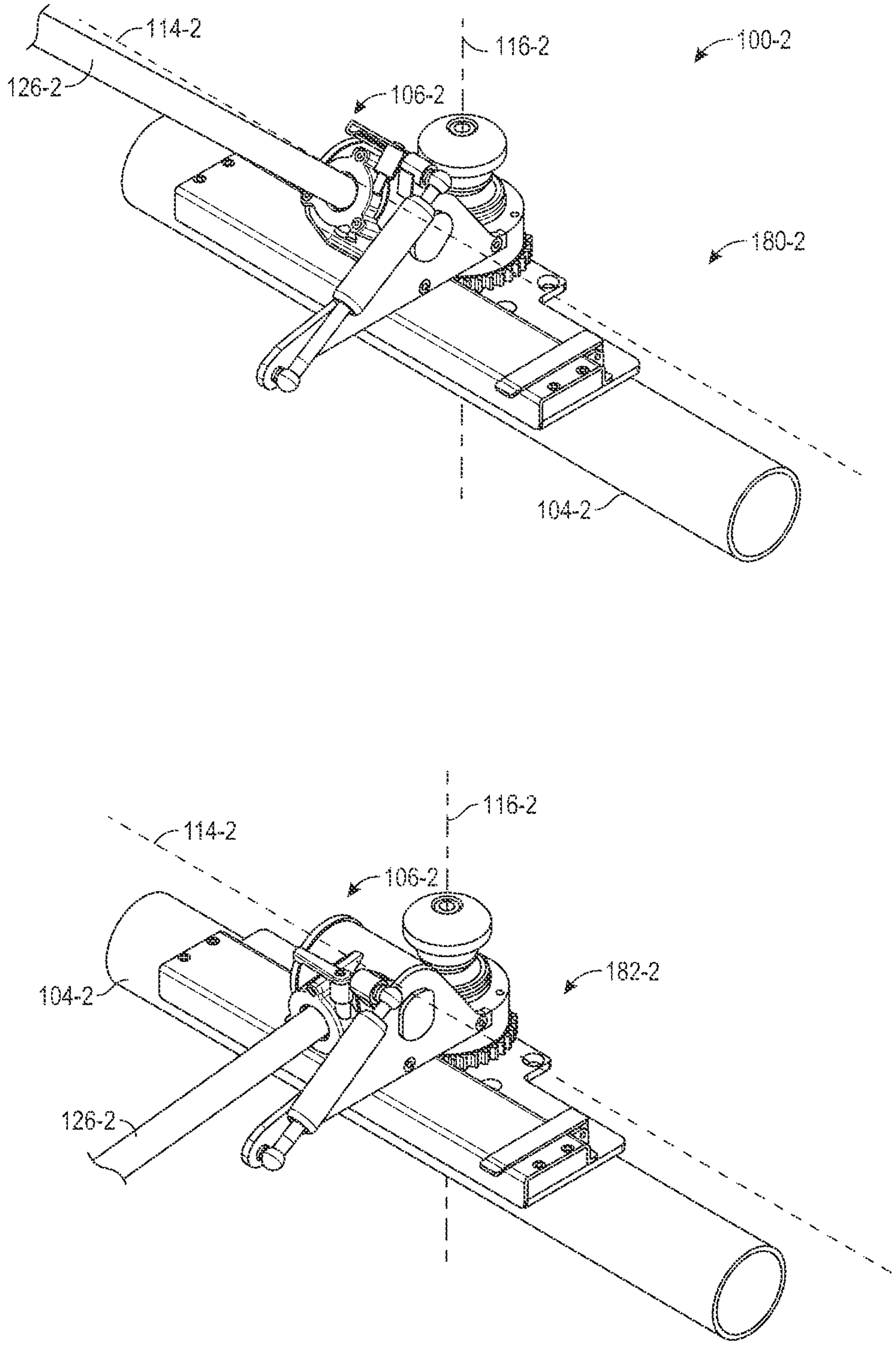
FIG. 19 illustrates various deployed and stowed positions of the rope management system, in accordance with various embodiments.
Figure 20:
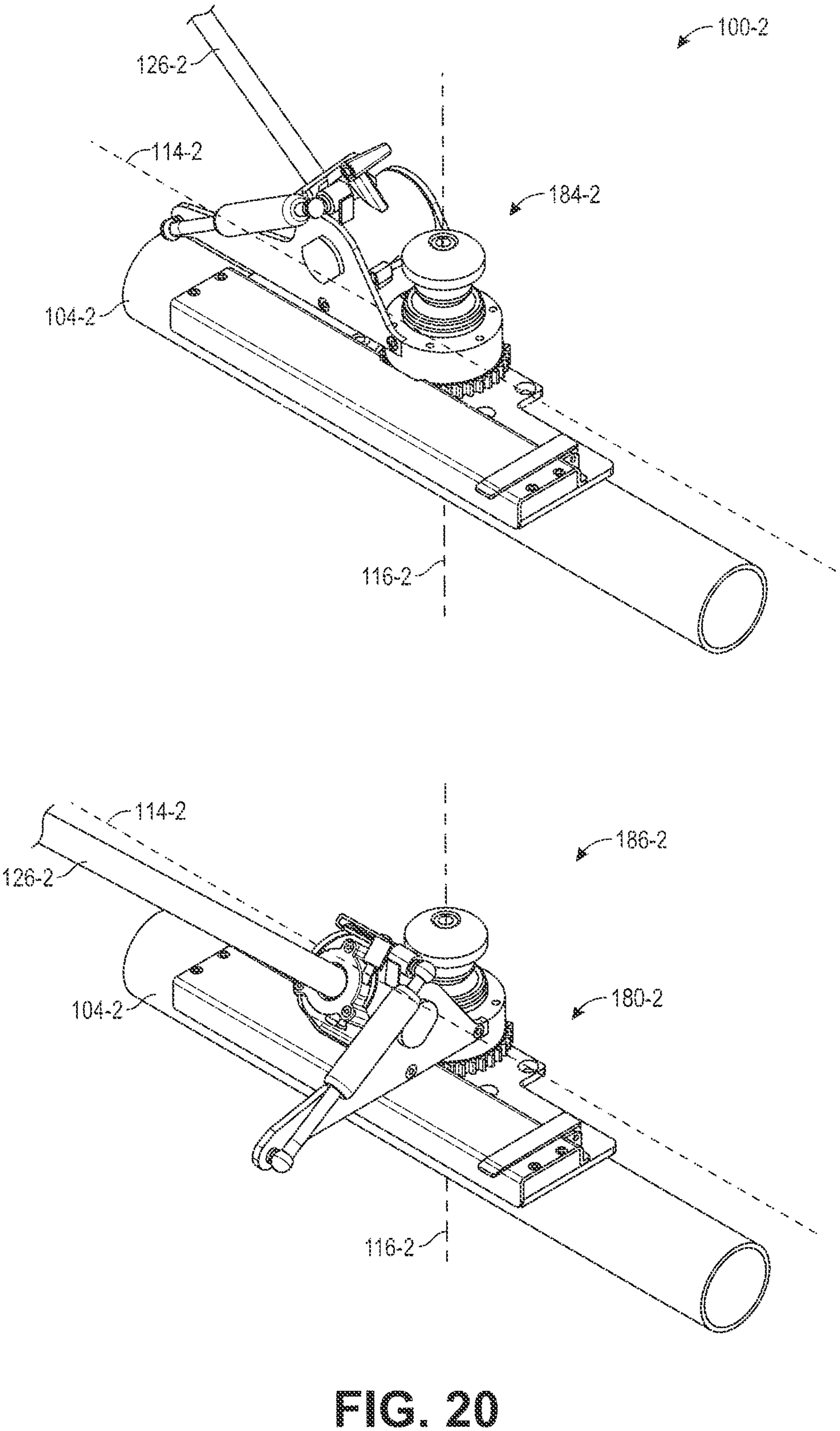
FIG. 20 illustrates various deployed and stowed positions of the rope management system, in accordance with various embodiments.

FIGS. 19 and 20 illustrate various deployed and stowed position of the rope management system 100-2, in accordance with various embodiments. For illustrative purposes, FIG. 19 depicts the vertical retraction unit 108-2 in the vertical deployed positions 186-2, however, the vertical retraction unit 108-2 may be oriented in various stowed or deployed positions as the lateral retraction unit 106-2 transitions between positions. FIG. 19 depicts the lateral retraction unit 106-2 in the lateral stowed position 180-2 and the lateral deployed position 182-2. As can be seen in these two positions 180-2, 182-2, a portion of the lateral retraction unit 106-2 has rotated about the lateral axis 114-2. In the lateral stowed position 180-2, the boom pole 126-2 is oriented towards the sky, e.g., above a plane defined by the top of the tower 104-2. In the lateral deployed position 182-2, the boom pole 126-2 is oriented toward the water, e.g., in a manner that intersects the plane defined by the top of the tower 104-2. This may be suitable for pulling a surfer behind the vessel 122-2.

For illustrative purposes, FIG. 20 depicts the lateral retraction unit 106-2 in the lateral stowed position 180-2, however, as mentioned with respect to FIG. 19, the lateral retraction unit 106-2 may be oriented in various stowed or deployed positions as the vertical retraction unit 108-2 transitions between positions. FIG. 20 depicts a vertical stowed position 184-2 and a vertical deployed position 186-2. As can be seen in these positions, a portion of the vertical retraction unit 108-2 has rotated about the vertical axis 116-2. In the vertical stowed position 184-2, the boom pole 126-2 is oriented toward the starboard side of the vessel 122-2. In the vertical stowed position 184-2, the boom pole 126-2 may be place at the side of the vessel 122-2 in a manner that is suitable for a surfer in the water to grab a handle 130-2 at an end of the boom pole 126-2 as the vessel 122-2 comes alongside the surfer. When the rope management apparatus 102-2 is in the vertical deployed position 186-2, the vertical retraction unit 106-2 may rotate about the vertical axis 116-2 such that the boom pole 126-2 is oriented toward the stern of the vessel 122-2. The vertical deployed position 186-2 may correspond to when the surfer is holding the handle 130-2 and being pulled behind the vessel 122-2, thereby putting tension on the rope management system 100-2. Furthermore, as the surfer is being pulled, the rope management system 100-2 may also be in the lateral deployed position 182-2. Thus, the lateral deployed position 182-2 and the vertical deployed position 186-2 may occur at the same time (e.g., when tension is put on the rope 128-2). Likewise, the lateral stowed position 180-2 and vertical stowed position 184-2 may occur at the same time (e.g., when tension is not put on the rope 128-2). The orientation of the vertical stowed position 184-2 may change depending on whether the surfer is regular or goofy stance. In an embodiment, the orientation of the vertical stowed position 184-2 may be changed by reindexing the components of the translating unit 198-2 in a mirrored position. For example, as illustrated in FIG. 16, the components of the translating unit 198-2 may be mirrored across the longitudinal axis 118-2 causing the vertical stowed position 184-2 to reorientate from one side of the vessel 122-2 to the opposite side of the vessel 122-2. Additionally or alternatively, the translating unit 198-2, as a whole, may be rotated about the vertical axis 116-2 and be remounted in a new orientation. For example, the translating unit 198-2 may be rotated 180 degrees and remounted causing the vertical stowed position 184-2 to be reorientated from one side of the vessel 122-2 to the opposite side of the vessel 122-2.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and all three of A, B, and C.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An apparatus for rope management, comprising:

a first retraction unit comprising a first rotating carrier, a fixed carrier, and a first resistive mechanism extending between the first rotating carrier and the fixed carrier, the first resistive mechanism biasing the first retraction unit in a first stowed position, the first rotating carrier configured to rotate from the first stowed position about a first rotational axis;

a second retraction unit coupled to the first retraction unit, the second retraction unit comprising a second rotating carrier and a translating unit, the translating unit comprising a translating element and a second resistive mechanism, the second resistive mechanism biasing the second retraction unit in a second stowed position, the translating element coupled to the second rotating carrier and the second resistive mechanism such that translation of the translating element causes rotation of the second rotating carrier from the second stowed position about a second rotational axis; and a mounting bracket configured for mounting the apparatus to a vessel.

2. The apparatus of claim 1, wherein the translating unit further comprises a base plate coupled to the mounting bracket, the second resistive mechanism and the translating element each supported by the mounting bracket in a substantially parallel orientation.

3. The apparatus of claim 1, wherein the second rotating carrier comprises a pinion gear and the translating element comprises a rack gear, and wherein the pinion gear is coupled to the rack gear via physical meshing of gear teeth of the pinion gear and the rack gear, and coupled to the second resistive mechanism via a connector block of the translating unit.

4. The apparatus of claim 1, wherein the second retraction unit is coupled to the first retraction unit via the second rotating carrier, and wherein rotation about the second rotational axis comprises rotation of the first retraction unit with respect to the translating unit.

5. The apparatus of claim 1, wherein the second resistive mechanism is biased to:

retain the second rotating carrier in the second stowed position; and allow rotation of the second rotating carrier about the second rotational axis from the second stowed position to a second deployed position in response to an exerted force.

6. The apparatus of claim 1, wherein a first end of the first resistive mechanism is coupled to the fixed carrier and a second end of the first resistive mechanism is rotatably coupled to the first rotating carrier, and wherein the first resistive mechanism is biased to:

retain the first rotating carrier in the first stowed position; and allow rotation of the first rotating carrier about the first rotational axis from the first stowed position to a first deployed position in response to an exerted force.

7. The apparatus of claim 1, wherein, when the apparatus is mounted to the vessel using the mounting bracket, the first rotational axis is substantially horizontal and the second rotational axis is substantially vertical.

8. The apparatus of claim 1, wherein the first retraction unit comprises an attachment point configured to receive a first end of a compliant member.

9. The apparatus of claim 8, wherein, when the apparatus is mounted to the vessel using the mounting bracket, rotation of the first rotating carrier about the first rotational axis from the first stowed position to a first deployed position causes the attachment point to move from a first orientation in which the attachment point is oriented away from the mounting bracket to a second orientation in which the attachment point is oriented towards the mounting bracket.

10. The apparatus of claim 8, wherein, when the apparatus is mounted to the vessel using the mounting bracket, rotation of the second rotating carrier about the second rotational axis from the second stowed position to a second deployed position causes the attachment point to move from a first orientation in which the attachment point is oriented towards a side of the vessel to a second orientation in which the attachment point is oriented towards a rear of the vessel.

11. The apparatus of claim 1, wherein an aperture is defined in the fixed carrier that extends longitudinally through the fixed carrier, and wherein the aperture is configured to receive a bolt to connect the apparatus to the vessel.

12. An apparatus for rope management, comprising:

a first retraction unit including a first rotating carrier and a fixed carrier, the first rotating carrier configured to provide rotation about a first rotational axis, the first rotating carrier biased along the first rotational axis, wherein the first retraction unit further comprises a first relative mechanism that is biased to retain the first rotating carrier in a first stowed position;

a second retraction unit including a second rotating carrier configured to provide rotation about a second rotational axis, the second retraction unit coupled to the first retraction unit via the fixed carrier that is aligned with the second rotating carrier along the second rotational axis, the second rotating carrier biased along the second rotational axis, wherein the second retraction unit further comprises a second resistive mechanism that is biased to retain the second rotating carrier in a second stowed position; and a mounting bracket coupled to the second retraction unit and configured for mounting the apparatus to a vessel.

13. The apparatus of claim 12, wherein the first resistive mechanism is biased to:

allow rotation of the first rotating carrier about the first rotational axis from the first stowed position to a first deployed position in response to an exerted force.

14. The apparatus of claim 13, wherein the second resistive mechanism is biased to:

allow rotation of the second rotating carrier about the second rotational axis from the second stowed position to a second deployed position.

15. The apparatus of claim 13, wherein the first resistive mechanism extends between the first rotating carrier and the fixed carrier, the fixed carrier is coupled to a first end of the first resistive mechanism, a second end of the first resistive mechanism is rotatably coupled to the first rotating carrier and configured to rotate with respect to the fixed carrier about the first rotational axis.

16. The apparatus of claim 12, wherein the first rotating carrier comprises an attachment point configured to receive a first end of a compliant member.

17. The apparatus of claim 12, further comprising a tow point aligned with the second rotating carrier along the second rotational axis.

* * * * *